United States Patent
Cariou

(10) Patent No.: US 10,251,125 B2
(45) Date of Patent: Apr. 2, 2019

(54) POWER RESTRICTION PERIOD FOR HIGH EFFICIENCY WIFI

(71) Applicant: Intel IP Corporation, Santa Clara, CA (US)

(72) Inventor: Laurent Cariou, Portland, OR (US)

(73) Assignee: Intel IP Corporation, Santa Clara, CA (US)

(*) Notice: Subject to any disclaimer, the term of this patent is extended or adjusted under 35 U.S.C. 154(b) by 0 days.

(21) Appl. No.: 15/714,501

(22) Filed: Sep. 25, 2017

(65) Prior Publication Data

US 2018/0317170 A1    Nov. 1, 2018

Related U.S. Application Data

(60) Provisional application No. 62/490,349, filed on Apr. 26, 2017.

(51) Int. Cl.
| | | |
|---|---|---|
| *H04W 52/02* | (2009.01) | |
| *H04W 72/12* | (2009.01) | |
| *H04W 72/04* | (2009.01) | |
| *H04W 76/28* | (2018.01) | |
| *H04W 76/30* | (2018.01) | |

(52) U.S. Cl.
CPC ... *H04W 52/0216* (2013.01); *H04W 72/0473* (2013.01); *H04W 72/1289* (2013.01); *H04W 76/28* (2018.02); *H04W 72/042* (2013.01); *H04W 76/30* (2018.02)

(58) Field of Classification Search
CPC ......... H04W 52/0216; H04W 72/1289; H04W 72/0473; H04W 76/28; H04W 72/042; H04W 76/30
See application file for complete search history.

(56) References Cited

U.S. PATENT DOCUMENTS

| | | | |
|---|---|---|---|
| 2015/0146812 A1* | 5/2015 | Chu | H04B 7/0417 375/267 |
| 2017/0094685 A1* | 3/2017 | Noh | H04W 72/042 |
| 2017/0105217 A1* | 4/2017 | Kwon | H04B 17/318 |
| 2017/0142659 A1* | 5/2017 | Noh | H04W 52/0245 |

* cited by examiner

*Primary Examiner* — Gbemileke J Onamuti
(74) *Attorney, Agent, or Firm* — Schwegman Lundberg & Woessner, P.A.

(57) ABSTRACT

A transmit power restriction period during which lower power transmissions may occur simultaneous with reception of other frames improves reuse of a wireless medium. In some aspects, a method includes continuing, by a wireless device, a back-off procedure when a first frame originating from outside a basic service set of the wireless device is received if a received energy of the first frame is below a threshold. Upon completion of the back-off procedure, a second frame may be transmitted at a reduced power level to avoid interfering with the first frame. The reduced transmit power level may be maintained for at least a predetermined time period or an end of a transmission opportunity of the wireless device, whichever is longer. Maintaining the reduced transmit power for the predetermined time period may prevent a subsequent transmission by the wireless device from unduly interfering with the first frame.

21 Claims, 15 Drawing Sheets

POWER RESTRICTION PERIOD FOR HIGH EFFICIENCY WIFI

CROSS REFERENCE TO RELATED APPLICATIONS

This application claims priority to U.S. Provisional Application No. 62/490,349, filed Apr. 26, 2017 and entitled "POWER RESTRICTION PERIOD." The content of this prior disclosure is considered part of this disclosure, and is hereby incorporated by reference in its entirety.

TECHNICAL FIELD

Embodiments pertain to wireless networks and wireless communications. Some embodiments relate to wireless local area networks (WLANs) and Wi-Fi networks including networks operating in accordance with the IEEE 802.11 family of standards. Some embodiments relate to IEEE 802.11ax. Some embodiments relate to methods, computer readable media, and apparatus for a power restriction period. In some embodiments, this power restriction period may occur after transmission of a physical layer convergence procedure (PLCP) protocol data unit (PPDU) while receiving a packet from a device that is outside the basic service set (BSS) of the transmitting device.

BACKGROUND

Efficient use of a wireless local-area network (WLAN) may provide acceptable transfer rates and acceptable response times to the users of the WLAN. In some environments, there are many devices trying to share the same resources causing these devices to content for access to the WLAN. Additionally, some devices may be limited by the communication protocol they use or by a bandwidth supported by the hardware of the device. Some wireless devices may need to operate with both newer protocols and with legacy device protocols. Therefore, improved systems, methods and devices for sharing a wireless medium are desirable.

BRIEF DESCRIPTION OF THE DRAWINGS

The present disclosure is illustrated by way of example and not limitation in the figures of the accompanying drawings, in which like references indicate similar elements and in which.

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Figure 1:
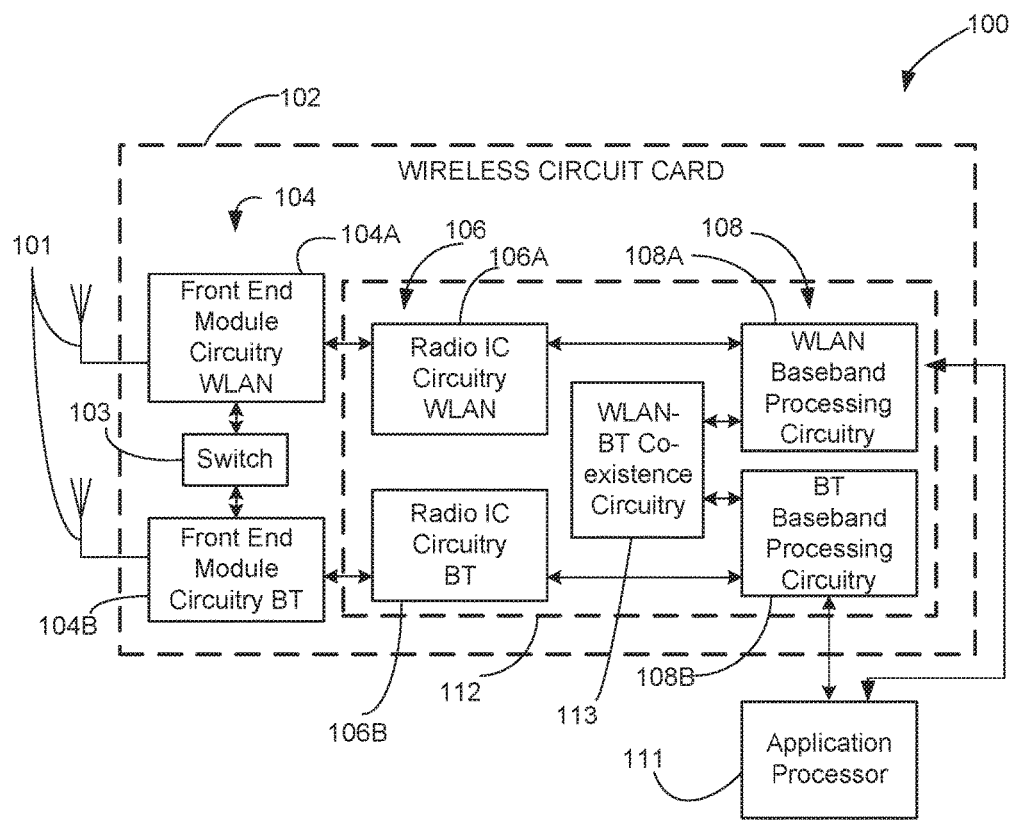
FIG. 1 is a block diagram of a radio architecture in accordance with some embodiments.

FIG. 1 is a block diagram of a radio architecture 100 in accordance with some embodiments. Radio architecture 100 may include radio front-end module (FEM) circuitry 104, radio IC circuitry 106 and baseband processing circuitry 108. Radio architecture 100 as shown includes both Wireless Local Area Network (WLAN) functionality and Bluetooth (BT) functionality although embodiments are not so limited. In this disclosure, "WLAN" and "Wi-Fi" are used interchangeably.

FEM circuitry 104 may include a WLAN or Wi-Fi FEM circuitry 104A and a Bluetooth (BT) FEM circuitry 104B. The WLAN FEM circuitry 104A may include a receive signal path comprising circuitry configured to operate on WLAN RF signals received from one or more antennas 101, to amplify the received signals and to provide the amplified versions of the received signals to the WLAN radio IC circuitry 106A for further processing. The BT FEM circuitry 104B may include a receive signal path which may include circuitry configured to operate on BT RF signals received from one or more antennas 101, to amplify the received signals and to provide the amplified versions of the received signals to the BT radio IC circuitry 106B for further processing. FEM circuitry 104A may also include a transmit signal path which may include circuitry configured to amplify WLAN signals provided by the radio IC circuitry 106A for wireless transmission by one or more of the antennas 101. In addition, FEM circuitry 104B may also include a transmit signal path which may include circuitry configured to amplify BT signals provided by the radio IC circuitry 106B for wireless transmission by the one or more antennas. In the embodiment of FIG. 1, although FEM 104A and FEM 104B are shown as being distinct from one another, embodiments are not so limited, and include within their scope the use of an FEM (not shown) that includes a transmit path and/or a receive path for both WLAN and BT signals, or the use of one or more FEM circuitries where at least some of the FEM circuitries share transmit and/or receive signal paths for both WLAN and BT signals.

Radio IC circuitry 106 as shown may include WLAN radio IC circuitry 106A and BT radio IC circuitry 106B. The WLAN radio IC circuitry 106A may include a receive signal path which may include circuitry to down-convert WLAN RF signals received from the FEM circuitry 104A and provide baseband signals to WLAN baseband processing circuitry 108A. BT radio IC circuitry 106B may in turn include a receive signal path which may include circuitry to down-convert BT RF signals received from the FEM circuitry 104B and provide baseband signals to BT baseband processing circuitry 108B. WLAN radio IC circuitry 106A may also include a transmit signal path which may include circuitry to up-convert WLAN baseband signals provided by the WLAN baseband processing circuitry 108A and provide WLAN RF output signals to the FEM circuitry 104A for subsequent wireless transmission by the one or more antennas 101. BT radio IC circuitry 106B may also include a transmit signal path which may include circuitry to up-convert BT baseband signals provided by the BT baseband processing circuitry 108B and provide BT RF output signals to the FEM circuitry 104B for subsequent wireless transmission by the one or more antennas 101. In the embodiment of FIG. 1, although radio IC circuitries 106A and 106B are shown as being distinct from one another, embodiments are not so limited, and include within their scope the use of a radio IC circuitry (not shown) that includes a transmit signal path and/or a receive signal path for both WLAN and BT signals, or the use of one or more radio IC circuitries where at least some of the radio IC circuitries share transmit and/or receive signal paths for both WLAN and BT signals.

Baseband processing circuitry 108 may include a WLAN baseband processing circuitry 108A and a BT baseband processing circuitry 108B. The WLAN baseband processing circuitry 108A may include a memory, such as, for example, a set of RAM arrays in a Fast Fourier Transform or Inverse Fast Fourier Transform block (not shown) of the WLAN baseband processing circuitry 108A. Each of the WLAN baseband circuitry 108A and the BT baseband circuitry 108B may further include one or more processors and control logic to process the signals received from the corresponding WLAN or BT receive signal path of the radio IC circuitry 106, and to also generate corresponding WLAN or BT baseband signals for the transmit signal path of the radio IC circuitry 106. Each of the baseband processing circuitries 108A and 108B may further include physical layer (PHY) and medium access control layer (MAC) circuitry, and may further interface with application processor 111 for generation and processing of the baseband signals and for controlling operations of the radio IC circuitry 106.

Referring still to FIG. 1, according to the shown embodiment, WLAN-BT coexistence circuitry 113 may include logic providing an interface between the WLAN baseband circuitry 108A and the BT baseband circuitry 108B to enable use cases requiring WLAN and BT coexistence. In addition, a switch 103 may be provided between the WLAN FEM circuitry 104A and the BT FEM circuitry 104B to allow switching between the WLAN and BT radios according to application needs. In addition, although the antennas 101 are depicted as being respectively connected to the WLAN FEM circuitry 104A and the BT FEM circuitry 104B, embodiments include within their scope the sharing of one or more antennas as between the WLAN and BT FEMs, or the provision of more than one antenna connected to each of FEM 104A or 104B.

In some embodiments, the front-end module circuitry 104, the radio IC circuitry 106, and baseband processing circuitry 108 may be provided on a single radio card, such as wireless radio card 102. In some other embodiments, the one or more antennas 101, the FEM circuitry 104 and the radio IC circuitry 106 may be provided on a single radio card. In some other embodiments, the radio IC circuitry 106 and the baseband processing circuitry 108 may be provided on a single chip or integrated circuit (IC), such as IC 112.

In some embodiments, the wireless radio card 102 may include a WLAN radio card and may be configured for Wi-Fi communications, although the scope of the embodiments is not limited in this respect. In some of these embodiments, the radio architecture 100 may be configured to receive and transmit orthogonal frequency division multiplexed (OFDM) or orthogonal frequency division multiple access (OFDMA) communication signals over a multicarrier communication channel. The OFDM or OFDMA signals may comprise a plurality of orthogonal subcarriers.

In some of these multicarrier embodiments, radio architecture 100 may be part of a Wi-Fi communication station (STA) such as a wireless access point (AP), a base station or a mobile device including a Wi-Fi device. In some of these embodiments, radio architecture 100 may be configured to transmit and receive signals in accordance with specific communication standards and/or protocols, such as any of the Institute of Electrical and Electronics Engineers (IEEE) standards including, IEEE 802.11n-2009, IEEE 802.11-2012, IEEE 802.11-2016, IEEE 802.11ac, and/or IEEE 802.11ax standards and/or proposed specifications for WLANs, although the scope of embodiments is not limited in this respect. Radio architecture 100 may also be suitable to transmit and/or receive communications in accordance with other techniques and standards.

In some embodiments, the radio architecture 100 may be configured for high-efficiency (HE) Wi-Fi (HEW) communications in accordance with the IEEE 802.11ax standard. In these embodiments, the radio architecture 100 may be configured to communicate in accordance with an OFDMA technique, although the scope of the embodiments is not limited in this respect.

In some other embodiments, the radio architecture 100 may be configured to transmit and receive signals transmitted using one or more other modulation techniques such as spread spectrum modulation (e.g., direct sequence code division multiple access (DS-CDMA) and/or frequency hopping code division multiple access (FH-CDMA)), time-division multiplexing (TDM) modulation, and/or frequency-division multiplexing (FDM) modulation, although the scope of the embodiments is not limited in this respect.

In some embodiments, as further shown in FIG. 1, the BT baseband circuitry 108B may be compliant with a Bluetooth (BT) connectivity standard such as Bluetooth, Bluetooth 4.0 or Bluetooth 5.0, or any other iteration of the Bluetooth Standard. In embodiments that include BT functionality as shown for example in FIG. 1, the radio architecture 100 may be configured to establish a BT synchronous connection oriented (SCO) link and/or a BT low energy (BT LE) link. In some of the embodiments that include functionality, the radio architecture 100 may be configured to establish an extended SCO (eSCO) link for BT communications, although the scope of the embodiments is not limited in this respect. In some of these embodiments that include a BT functionality, the radio architecture may be configured to engage in a BT Asynchronous Connection-Less (ACL) communications, although the scope of the embodiments is not limited in this respect. In some embodiments, as shown in FIG. 1, the functions of a BT radio card and WLAN radio card may be combined on a single wireless radio card, such as single wireless radio card 102, although embodiments are not so limited, and include within their scope discrete WLAN and BT radio cards In some embodiments, the radio-architecture 100 may include other radio cards, such as a cellular radio card configured for cellular (e.g., 3GPP such as LTE, LTE-Advanced or 5G communications).

In some IEEE 802.11 embodiments, the radio architecture 100 may be configured for communication over various channel bandwidths including bandwidths having center frequencies of about 900 MHz, 2.4 GHz, 5 GHz, and bandwidths of about 1 MHz, 2 MHz, 2.5 MHz, 4 MHz, 5 MHz, 8 MHz, 10 MHz, 16 MHz, 20 MHz, 40 MHz, 80 MHz (with contiguous bandwidths) or 80+80 MHz (160 MHz) (with non-contiguous bandwidths). In some embodiments, a 320 MHz channel bandwidth may be used. The scope of the embodiments is not limited with respect to the above center frequencies however.

Figure 2:
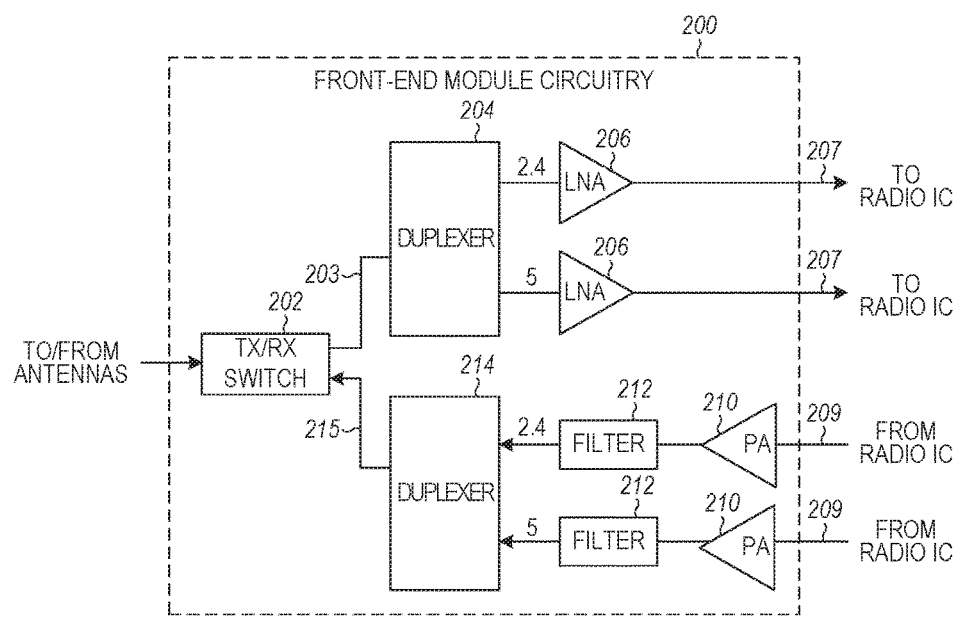
FIG. 2 illustrates a front-end module circuitry for use in the radio architecture of FIG. 1 in accordance with some embodiments.

FIG. 2 illustrates FEM circuitry 200 in accordance with some embodiments. The FEM circuitry 200 is one example of circuitry that may be suitable for use as the WLAN and/or BT FEM circuitry 104A/104B (FIG. 1), although other circuitry configurations may also be suitable.

In some embodiments, the FEM circuitry 200 may include a TX/RX switch 202 to switch between transmit mode and receive mode operation. The FEM circuitry 200 may include a receive signal path and a transmit signal path. The receive signal path of the FEM circuitry 200 may include a low-noise amplifier (LNA) 206 to amplify received RF signals 203 and provide the amplified received RF signals 207 as an output (e.g., to the radio IC circuitry 106 (FIG. 1)). The transmit signal path of the circuitry 200 may include a power amplifier (PA) to amplify input RF signals 209 (e.g., provided by the radio IC circuitry 106), and one or more filters 212, such as band-pass filters (BPFs), low-pass filters (LPFs) or other types of filters, to generate RF signals 215 for subsequent transmission (e.g., by one or more of the antennas 101 (FIG. 1)).

In some dual-mode embodiments for Wi-Fi communication, the FEM circuitry 200 may be configured to operate in either the 2.4 GHz frequency spectrum or the 5 GHz frequency spectrum. In these embodiments, the receive signal path of the FEM circuitry 200 may include a receive signal path duplexer 204 to separate the signals from each spectrum as well as provide a separate LNA 206 for each spectrum as shown. In these embodiments, the transmit signal path of the FEM circuitry 200 may also include a power amplifier 210 and a filter 212, such as a BPF, a LPF or another type of filter for each frequency spectrum and a transmit signal path duplexer 214 to provide the signals of one of the different spectrums onto a single transmit path for subsequent transmission by the one or more of the antennas 101 (FIG. 1). In some embodiments, BT communications may utilize the 2.4 GHZ signal paths and may utilize the same FEM circuitry 200 as the one used for WLAN communications.

Figure 3:
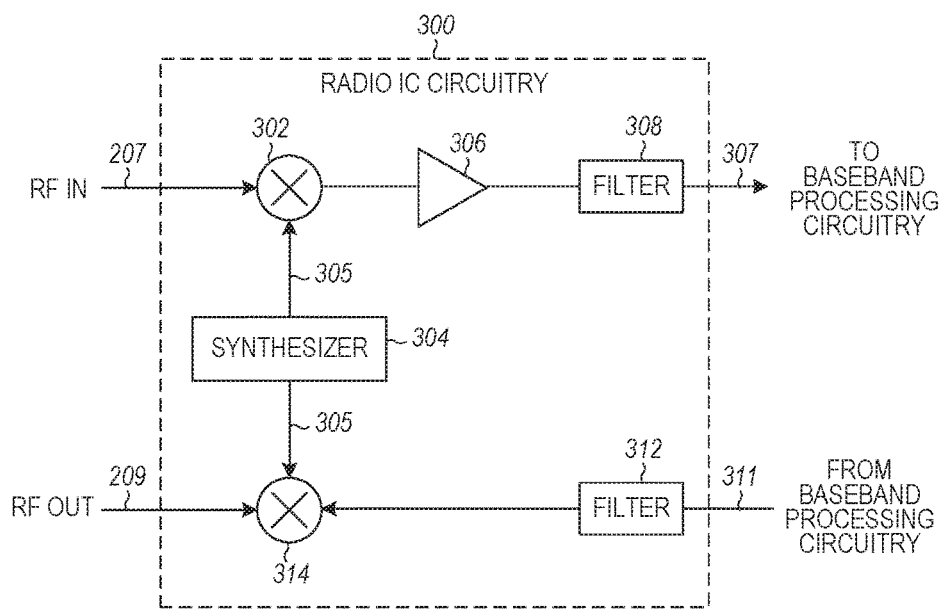
FIG. 3 illustrates a radio IC circuitry for use in the radio architecture of FIG. 1 in accordance with some embodiments.

FIG. 3 illustrates radio IC circuitry 300 in accordance with some embodiments. The radio IC circuitry 300 is one example of circuitry that may be suitable for use as the WLAN or BT radio IC circuitry 106A/106B (FIG. 1), although other circuitry configurations may also be suitable.

In some embodiments, the radio IC circuitry 300 may include a receive signal path and a transmit signal path. The receive signal path of the radio IC circuitry 300 may include at least mixer circuitry 302, such as, for example, down-conversion mixer circuitry, amplifier circuitry 306 and filter circuitry 308. The transmit signal path of the radio IC circuitry 300 may include at least filter circuitry 312 and mixer circuitry 314, such as, for example, up-conversion mixer circuitry. Radio IC circuitry 300 may also include synthesizer circuitry 304 for synthesizing a frequency 305 for use by the mixer circuitry 302 and the mixer circuitry 314. The mixer circuitry 302 and/or 314 may each, according to some embodiments, be configured to provide direct conversion functionality. The latter type of circuitry presents a much simpler architecture as compared with standard super-heterodyne mixer circuitries, and any flicker noise brought about by the same may be alleviated for example through the use of OFDM modulation. FIG. 3 illustrates only a simplified version of a radio IC circuitry, and may include, although not shown, embodiments where each of the depicted circuitries may include more than one component. For instance, mixer circuitry 320 and/or 314 may each include one or more mixers, and filter circuitries 308 and/or 312 may each include one or more filters, such as one or more BPFs and/or LPFs according to application needs. For example, when mixer circuitries are of the direct-conversion type, they may each include two or more mixers.

In some embodiments, mixer circuitry 302 may be configured to down-convert RF signals 207 received from the FEM circuitry 104 (FIG. 1) based on the synthesized frequency 305 provided by synthesizer circuitry 304. The amplifier circuitry 306 may be configured to amplify the down-converted signals and the filter circuitry 308 may include a LPF configured to remove unwanted signals from the down-converted signals to generate output baseband signals 307. Output baseband signals 307 may be provided to the baseband processing circuitry 108 (FIG. 1) for further processing. In some embodiments, the output baseband signals 307 may be zero-frequency baseband signals, although this is not a requirement. In some embodiments, mixer circuitry 302 may comprise passive mixers, although the scope of the embodiments is not limited in this respect.

In some embodiments, the mixer circuitry 314 may be configured to up-convert input baseband signals 311 based on the synthesized frequency 305 provided by the synthesizer circuitry 304 to generate RF output signals 209 for the FEM circuitry 104. The baseband signals 311 may be provided by the baseband processing circuitry 108 and may be filtered by filter circuitry 312. The filter circuitry 312 may include a LPF or a BPF, although the scope of the embodiments is not limited in this respect.

In some embodiments, the mixer circuitry 302 and the mixer circuitry 314 may each include two or more mixers and may be arranged for quadrature down-conversion and/or up-conversion respectively with the help of synthesizer 304. In some embodiments, the mixer circuitry 302 and the mixer circuitry 314 may each include two or more mixers each configured for image rejection (e.g., Hartley image rejection). In some embodiments, the mixer circuitry 302 and the mixer circuitry 314 may be arranged for direct down-conversion and/or direct up-conversion, respectively. In some embodiments, the mixer circuitry 302 and the mixer circuitry 314 may be configured for super-heterodyne operation, although this is not a requirement.

Mixer circuitry 302 may comprise, according to one embodiment: quadrature passive mixers (e.g., for the in-phase (I) and quadrature phase (Q) paths). In such an embodiment, RF input signal 207 from FIG. 3 may be down-converted to provide I and Q baseband output signals to be sent to the baseband processor Quadrature passive mixers may be driven by zero and ninety-degree time-varying LO switching signals provided by a quadrature circuitry which may be configured to receive a LO frequency (fLO) from a local oscillator or a synthesizer, such as LO frequency 305 of synthesizer 304 (FIG. 3). In some embodiments, the LO frequency may be the carrier frequency, while in other embodiments, the LO frequency may be a fraction of the carrier frequency (e.g., one-half the carrier frequency, one-third the carrier frequency). In some embodiments, the zero and ninety-degree time-varying switching signals may be generated by the synthesizer, although the scope of the embodiments is not limited in this respect.

In some embodiments, the LO signals may differ in duty cycle (the percentage of one period in which the LO signal is high) and/or offset (the difference between start points of the period). In some embodiments, the LO signals may have a 25% duty cycle and a 50% offset. In some embodiments, each branch of the mixer circuitry (e.g., the in-phase (I) and quadrature phase (Q) path) may operate at a 25% duty cycle, which may result in a significant reduction is power consumption.

The RF input signal 207 (FIG. 2) may comprise a balanced signal, although the scope of the embodiments is not limited in this respect. The I and Q baseband output signals may be provided to low-nose amplifier, such as amplifier circuitry 306 (FIG. 3) or to filter circuitry 308 (FIG. 3).

In some embodiments, the output baseband signals 307 and the input baseband signals 311 may be analog baseband signals, although the scope of the embodiments is not limited in this respect. In some alternate embodiments, the output baseband signals 307 and the input baseband signals 311 may be digital baseband signals. In these alternate embodiments, the radio IC circuitry may include analog-to-digital converter (ADC) and digital-to-analog converter (DAC) circuitry.

In some dual-mode embodiments, a separate radio IC circuitry may be provided for processing signals for each spectrum, or for other spectrums not mentioned here, although the scope of the embodiments is not limited in this respect.

In some embodiments, the synthesizer circuitry 304 may be a fractional-N synthesizer or a fractional N/N+1 synthesizer, although the scope of the embodiments is not limited in this respect as other types of frequency synthesizers may be suitable. For example, synthesizer circuitry 304 may be a delta-sigma synthesizer, a frequency multiplier, or a synthesizer comprising a phase-locked loop with a frequency divider. According to some embodiments, the synthesizer circuitry 304 may include digital synthesizer circuitry. An advantage of using a digital synthesizer circuitry is that, although it may still include some analog components, its footprint may be scaled down much more than the footprint of an analog synthesizer circuitry. In some embodiments, frequency input into synthesizer circuitry 304 may be provided by a voltage controlled oscillator (VCO), although that is not a requirement. A divider control input may further be provided by either the baseband processing circuitry 108 (FIG. 1) or the application processor 111 (FIG. 1) depending on the desired output frequency 305. In some embodiments, a divider control input (e.g., N) may be determined from a look-up table (e.g., within a Wi-Fi card) based on a channel number and a channel center frequency as determined or indicated by the application processor 111.

In some embodiments, synthesizer circuitry 304 may be configured to generate a carrier frequency as the output frequency 305, while in other embodiments, the output frequency 305 may be a fraction of the carrier frequency (e.g., one-half the carrier frequency, one-third the carrier frequency). In some embodiments, the output frequency 305 may be a LO frequency (fLO).

Figure 4:
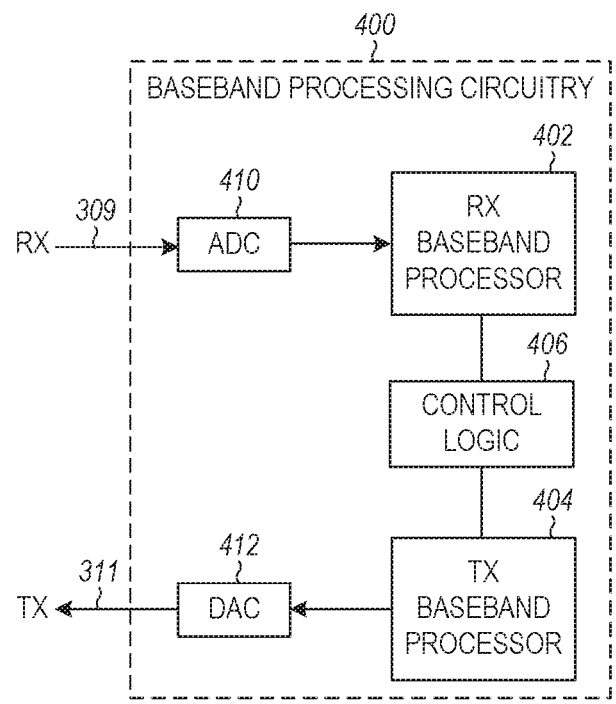
FIG. 4 illustrates a baseband processing circuitry for use in the radio architecture of FIG. 1 in accordance with some embodiments.

FIG. 4 illustrates a functional block diagram of baseband processing circuitry 400 in accordance with some embodiments. The baseband processing circuitry 400 is one example of circuitry that may be suitable for use as the baseband processing circuitry 108 (FIG. 1), although other circuitry configurations may also be suitable. The baseband processing circuitry 400 may include a receive baseband processor (RX BBP) 402 for processing receive baseband signals 309 provided by the radio IC circuitry 106 (FIG. 1) and a transmit baseband processor (TX BBP) 404 for generating transmit baseband signals 311 for the radio IC circuitry 106. The baseband processing circuitry 400 may also include control logic 406 for coordinating the operations of the baseband processing circuitry 400.

In some embodiments (e.g., when analog baseband signals are exchanged between the baseband processing circuitry 400 and the radio IC circuitry 106), the baseband processing circuitry 400 may include ADC 410 to convert analog baseband signals received from the radio IC circuitry 106 to digital baseband signals for processing by the RX BBP 402. In these embodiments, the baseband processing circuitry 400 may also include DAC 412 to convert digital baseband signals from the TX BBP 404 to analog baseband signals.

In some embodiments that communicate OFDM signals or OFDMA signals, such as through baseband processor 108A, the transmit baseband processor 404 may be configured to generate OFDM or OFDMA signals as appropriate for transmission by performing an inverse fast Fourier transform (IFFT). The receive baseband processor 402 may be configured to process received OFDM signals or OFDMA signals by performing an FFT. In some embodiments, the receive baseband processor 402 may be configured to detect the presence of an OFDM signal or OFDMA signal by performing an autocorrelation, to detect a preamble, such as a short preamble, and by performing a cross-correlation, to detect a long preamble. The preambles may be part of a predetermined frame structure for Wi-Fi communication.

Referring back to FIG. 1, in some embodiments, the antennas 101 (FIG. 1) may each comprise one or more directional or omnidirectional antennas, including, for example, dipole antennas, monopole antennas, patch antennas, loop antennas, microstrip antennas or other types of antennas suitable for transmission of RF signals. In some multiple-input multiple-output (MIMO) embodiments, the antennas may be effectively separated to take advantage of spatial diversity and the different channel characteristics that may result. Antennas 101 may each include a set of phased-array antennas, although embodiments are not so limited.

Although the radio-architecture 100 is illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements may refer to one or more processes operating on one or more processing elements.

Figure 5:
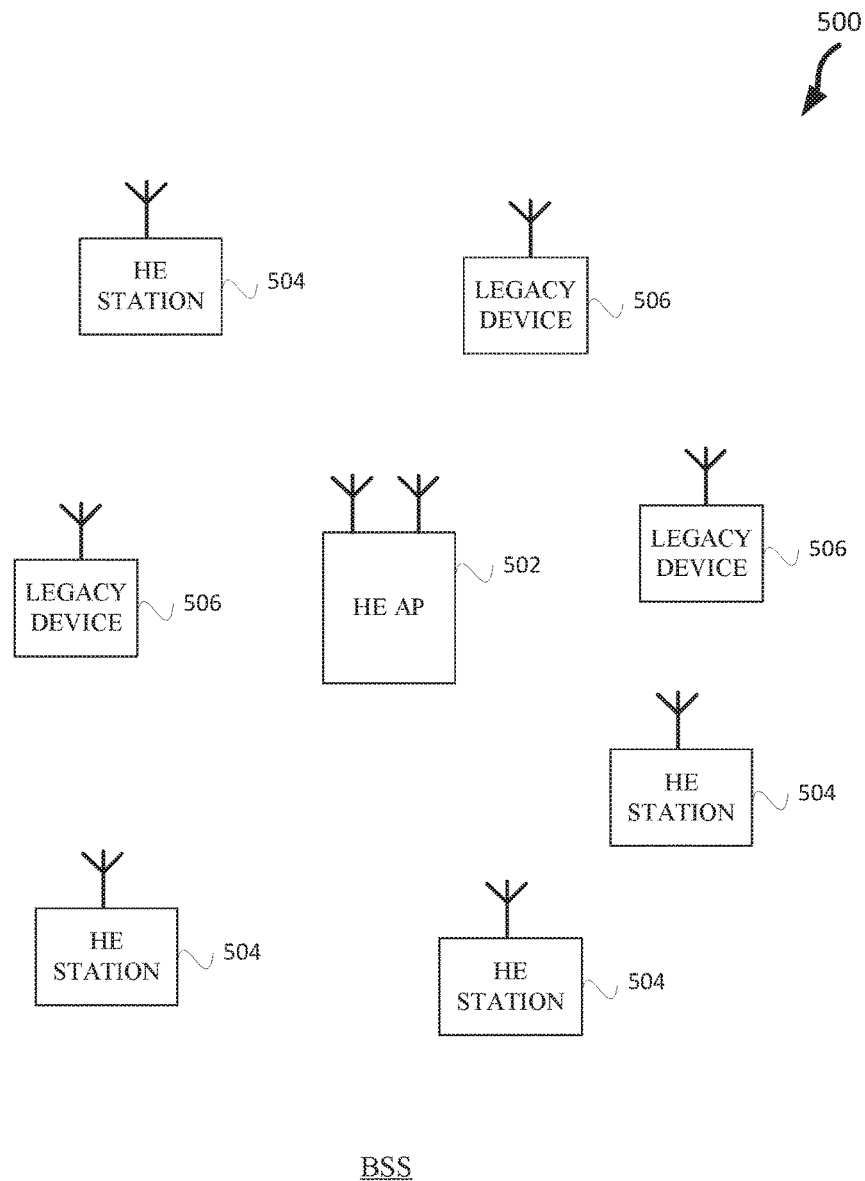
FIG. 5 illustrates a WLAN in accordance with some embodiments.

FIG. 5 illustrates a WLAN 500 in accordance with some embodiments. The WLAN 500 may comprise a basis service set (BSS) that may include a HE access point (AP) 502, which may be an AP, a plurality of high-efficiency wireless (e.g., IEEE 802.11ax) (HE) stations 504, and a plurality of legacy (e.g., IEEE 802.11n/ac) devices 506.

The HE AP 502 may be an AP using the IEEE 802.11 to transmit and receive. The HE AP 502 may be a base station. The HE AP 502 may use other communications protocols as well as the IEEE 802.11 protocol. The IEEE 802.11 protocol may be IEEE 802.11ax. The IEEE 802.11 protocol may include using orthogonal frequency division multiple-access (OFDMA), time division multiple access (TDMA), and/or code division multiple access (CDMA). The IEEE 802.11 protocol may include a multiple access technique. For example, the IEEE 802.11 protocol may include space-division multiple access (SDMA) and/or multiple-user multiple-input multiple-output (MU-MIMO). There may be more than one HE AP 502 that is part of an extended service set (ESS). A controller (not illustrated) may store information that is common to the more than one HE APs 502.

The legacy devices 506 may operate in accordance with one or more of IEEE 802.11 a/b/g/n/ac/ad/af/ah/aj/ay, or another legacy wireless communication standard. The legacy devices 506 may be STAs or IEEE STAs. The HE STAs 504 may be wireless transmit and receive devices such as cellular telephone, portable electronic wireless communication devices, smart telephone, handheld wireless device, wireless glasses, wireless watch, wireless personal device, tablet, or another device that may be transmitting and receiving using the IEEE 802.11 protocol such as IEEE 802.11ax or another wireless protocol. In some embodiments, the HE STAs 504 may be termed high efficiency (HE) stations.

The HE AP 502 may communicate with legacy devices 506 in accordance with legacy IEEE 802.11 communication techniques. In example embodiments, the HE AP 502 may also be configured to communicate with HE STAs 504 in accordance with legacy IEEE 802.11 communication techniques.

In some embodiments, a HE frame may be configurable to have the same bandwidth as a channel. The HE frame may be a physical Layer Convergence Procedure (PLCP) Protocol Data Unit (PPDU). In some embodiments, there may be different types of PPDUs that may have different fields and different physical layers and/or different media access control (MAC) layers.

The bandwidth of a channel may be 20 MHz, 40 MHz, or 80 MHz, 160 MHz, 320 MHz contiguous bandwidths or an 80+80 MHz (160 MHz) non-contiguous bandwidth. In some embodiments, the bandwidth of a channel may be 1 MHz, 1.25 MHz, 2.03 MHz, 2.5 MHz, 4.06 MHz, 5 MHz and 10 MHz, or a combination thereof or another bandwidth that is less or equal to the available bandwidth may also be used. In some embodiments, the bandwidth of the channels may be based on a number of active data subcarriers. In some embodiments, the bandwidth of the channels is based on 26, 52, 106, 242, 484, 996, or 2×996 active data subcarriers or tones that are spaced by 20 MHz. In some embodiments, the bandwidth of the channels is 256 tones spaced by 20 MHz. In some embodiments, the channels are multiple of 26 tones or a multiple of 20 MHz. In some embodiments, a 20 MHz channel may comprise 242 active data subcarriers or tones, which may determine the size of a Fast Fourier Transform (FFT). An allocation of a bandwidth or a number of tones or sub-carriers may be termed a resource unit (RU) allocation in accordance with some embodiments.

In some embodiments, the 26-subcarrier RU and 52-subcarrier RU are used in the 20 MHz, 40 MHz, 80 MHz, 160 MHz and 80+80 MHz OFDMA HE PPDU formats. In some embodiments, the 106-subcarrier RU is used in the 20 MHz, 40 MHz, 80 MHz, 160 MHz and 80+80 MHz OFDMA and MU-MIMO HE PPDU formats. In some embodiments, the 242-subcarrier RU is used in the 40 MHz, 80 MHz, 160 MHz and 80+80 MHz OFDMA and MU-MIMO HE PPDU formats. In some embodiments, the 484-subcarrier RU is used in the 80 MHz, 160 MHz and 80+80 MHz OFDMA and MU-MIMO HE PPDU formats. In some embodiments, the 996-subcarrier RU is used in the 160 MHz and 80+80 MHz OFDMA and MU-MIMO HE PPDU formats.

A HE frame may be configured for transmitting a number of spatial streams, which may be in accordance with MU-MIMO and may be in accordance with OFDMA. In other embodiments, the HE AP 502, HE STA 504, and/or legacy device 506 may also implement different technologies such as code division multiple access (CDMA) 2000, CDMA 2000 1×, CDMA 2000 Evolution-Data Optimized (EV-DO), Interim Standard 2000 (IS-2000), Interim Standard 95 (IS-95), Interim Standard 856 (IS-856), Long Term Evolution (LTE), Global System for Mobile communications (GSM), Enhanced Data rates for GSM Evolution (EDGE), GSM EDGE (GERAN), IEEE 802.16 (e.g., Worldwide Interoperability for Microwave Access (WiMAX)), BlueTooth®, or other technologies.

Some embodiments relate to HE communications. In accordance with some IEEE 802.11 embodiments, e.g., IEEE 802.11ax embodiments, a HE AP 502 may operate as a master station which may be arranged to contend for a wireless medium (e.g., during a contention period) to receive exclusive control of the medium for an HE control period. In some embodiments, the HE control period may be termed a transmission opportunity (TXOP). The HE AP 502 may transmit a HE master-sync transmission, which may be a trigger frame or HE control and schedule transmission, at the beginning of the HE control period. The HE AP 502 may transmit a time duration of the TXOP and sub-channel information. During the HE control period, HE STAs 504 may communicate with the HE AP 502 in accordance with a non-contention based multiple access technique such as OFDMA or MU-MIMO. This is unlike conventional WLAN communications in which devices communicate in accordance with a contention-based communication technique, rather than a multiple access technique. During the HE control period, the HE AP 502 may communicate with HE stations 504 using one or more HE frames. During the HE control period, the HE STAs 504 may operate on a sub-channel smaller than the operating range of the HE AP 502. During the HE control period, legacy stations refrain from communicating. The legacy stations may need to receive the communication from the HE AP 502 to defer from communicating.

In accordance with some embodiments, during the TXOP the HE STAs 504 may contend for the wireless medium with the legacy devices 506 being excluded from contending for the wireless medium during the master-sync transmission. In some embodiments the trigger frame may indicate an uplink (UL) UL-MU-MIMO and/or UL OFDMA TXOP. In some embodiments, the trigger frame may include a DL UL-MU-MIMO and/or DL OFDMA with a schedule indicated in a preamble portion of trigger frame.

In some embodiments, the multiple-access technique used during the HE TXOP may be a scheduled OFDMA technique, although this is not a requirement. In some embodiments, the multiple access technique may be a time-division multiple access (TDMA) technique or a frequency division multiple access (FDMA) technique. In some embodiments, the multiple access technique may be a space-division multiple access (SDMA) technique. In some embodiments, the multiple access technique may be a Code division multiple access (CDMA).

The HE AP 502 may also communicate with legacy stations 506 and/or HE stations 504 in accordance with legacy IEEE 802.11 communication techniques. In some embodiments, the HE AP 502 may also be configurable to communicate with HE stations 504 outside the HE TXOP in accordance with legacy IEEE 802.11 communication techniques, although this is not a requirement.

In some embodiments the HE station 504 may be a "group owner" (GO) for peer-to-peer modes of operation. A wireless device may be a HE station 502 or a HE AP 502.

In some embodiments, the HE station 504 and/or HE AP 502 may be configured to operate in accordance with IEEE 802.11mc. In example embodiments, the radio architecture of FIG. 1 is configured to implement the HE station 504 and/or the HE AP 502. In example embodiments, the front-end module circuitry of FIG. 2 is configured to implement the HE station 504 and/or the HE AP 502. In example embodiments, the radio IC circuitry of FIG. 3 is configured to implement the HE station 504 and/or the HE AP 502. In example embodiments, the base-band processing circuitry of FIG. 4 is configured to implement the HE station 504 and/or the HE AP 502.

In example embodiments, the HE stations 504, HE AP 502, an apparatus of the HE stations 504, and/or an apparatus of the HE AP 502 may include one or more of the following: the radio architecture of FIG. 1, the front-end module circuitry of FIG. 2, the radio IC circuitry of FIG. 3, and/or the base-band processing circuitry of FIG. 4.

In example embodiments, the radio architecture of FIG. 1, the front-end module circuitry of FIG. 2, the radio IC circuitry of FIG. 3, and/or the base-band processing circuitry of FIG. 4 may be configured to perform the methods and operations/functions herein described in conjunction with FIGS. 1-9.

In example embodiments, the HE station 504 and/or the HE AP 502 are configured to perform the methods and operations/functions described herein in conjunction with FIGS. 1-9. In example embodiments, an apparatus of the HE station 504 and/or an apparatus of the HE AP 502 are configured to perform the methods and functions described herein in conjunction with FIGS. 1-9. The term Wi-Fi may refer to one or more of the IEEE 802.11 communication standards. AP and STA may refer to HE access point 502 and/or HE station 504 as well as legacy devices 506.

In some embodiments, a HE AP STA may refer to a HE AP 502 and a HE STAs 504 that is operating a HE APs 502. In some embodiments, when an HE STA 504 is not operating as a HE AP, it may be referred to as a HE non-AP STA or HE non-AP. In some embodiments, HE STA 504 may be referred to as either a HE AP STA or a HE non-AP.

Figure 6:
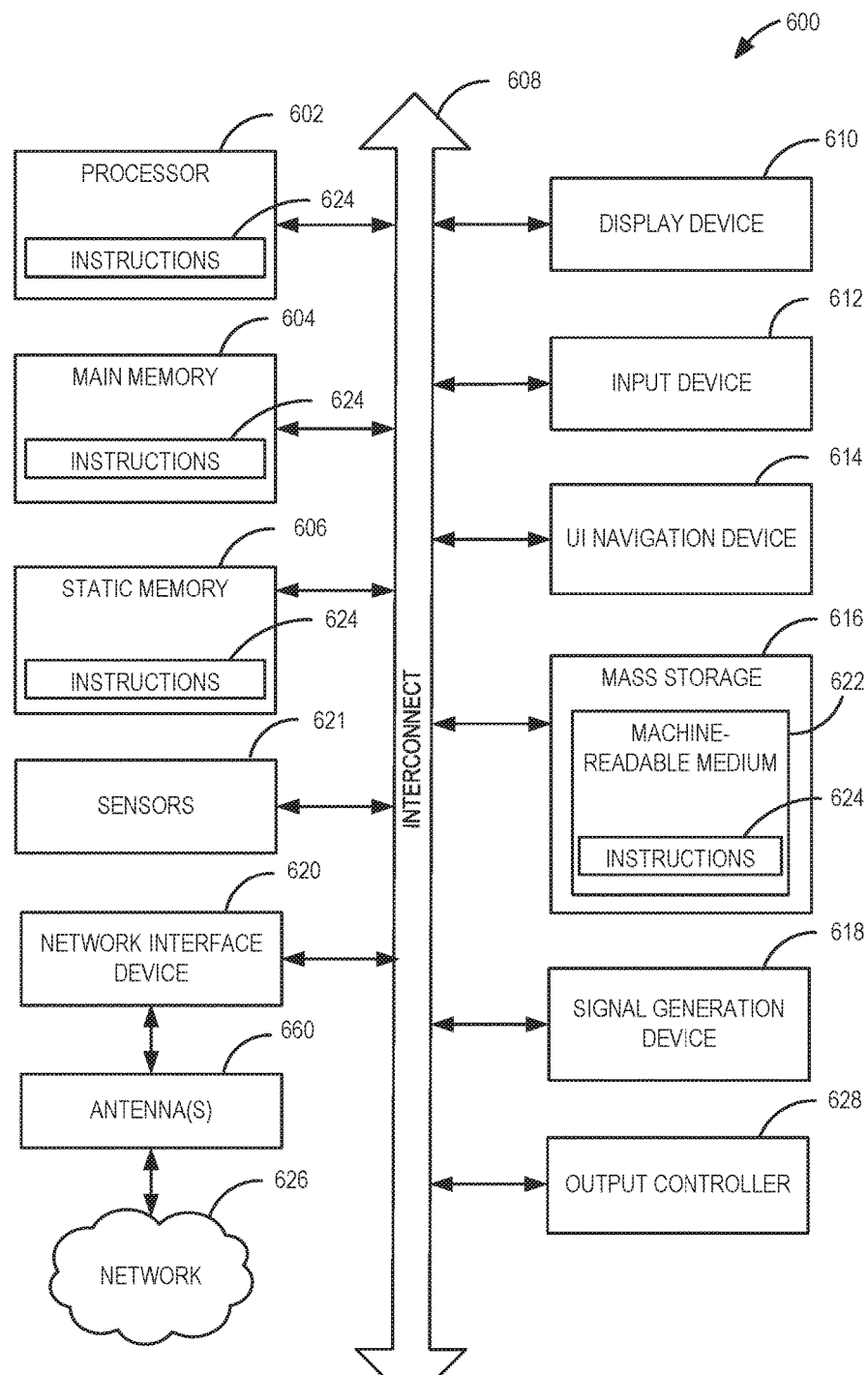
FIG. 6 illustrates a block diagram of an example machine upon which any one or more of the techniques (e.g., methodologies) discussed herein may perform.

FIG. 6 illustrates a block diagram of an example machine 600 upon which any one or more of the techniques (e.g., methodologies) discussed herein may perform. In alternative embodiments, the machine 600 may operate as a standalone device or may be connected (e.g., networked) to other machines. In a networked deployment, the machine 600 may operate in the capacity of a server machine, a client machine, or both in server-client network environments. In an example, the machine 600 may act as a peer machine in peer-to-peer (P2P) (or other distributed) network environment. The machine 600 may be a HE AP 502, HE station 504, personal computer (PC), a tablet PC, a set-top box (STB), a personal digital assistant (PDA), a portable communications device, a mobile telephone, a smart phone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Machine (e.g., computer system) 600 may include a hardware processor 602 (e.g., a central processing unit (CPU), a graphics processing unit (GPU), a hardware processor core, or any combination thereof), a main memory 604 and a static memory 606, some or all of which may communicate with each other via an interlink (e.g., bus) 608.

Specific examples of main memory 604 include Random Access Memory (RAM), and semiconductor memory devices, which may include, in some embodiments, storage locations in semiconductors such as registers. Specific examples of static memory 606 include non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; RAM; and CD-ROM and DVD-ROM disks.

The machine 600 may further include a display device 610, an input device 612 (e.g., a keyboard), and a user interface (UI) navigation device 614 (e.g., a mouse). In an example, the display device 610, input device 612 and UI navigation device 614 may be a touch screen display. The machine 600 may additionally include a mass storage (e.g., drive unit) 616, a signal generation device 618 (e.g., a speaker), a network interface device 620, and one or more sensors 621, such as a global positioning system (GPS) sensor, compass, accelerometer, or other sensor. The machine 600 may include an output controller 628, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.). In some embodiments the processor 602 and/or instructions 624 may comprise processing circuitry and/or transceiver circuitry.

The storage device 616 may include a machine readable medium 622 on which is stored one or more sets of data structures or instructions 624 (e.g., software) embodying or utilized by any one or more of the techniques or functions described herein. The instructions 624 may also reside, completely or at least partially, within the main memory 604, within static memory 606, or within the hardware processor 602 during execution thereof by the machine 600. In an example, one or any combination of the hardware processor 602, the main memory 604, the static memory 606, or the storage device 616 may constitute machine readable media.

Specific examples of machine readable media may include: non-volatile memory, such as semiconductor memory devices (e.g., EPROM or EEPROM) and flash memory devices; magnetic disks, such as internal hard disks and removable disks; magneto-optical disks; RAM; and CD-ROM and DVD-ROM disks.

While the machine readable medium 622 is illustrated as a single medium, the term "machine readable medium" may include a single medium or multiple media (e.g., a centralized or distributed database, and/or associated caches and servers) configured to store the one or more instructions 624.

An apparatus of the machine 600 may be one or more of a hardware processor 602 (e.g., a central processing unit (CPU), a graphics processing unit (GPU), a hardware processor core, or any combination thereof), a main memory 604 and a static memory 606, sensors 621, network interface device 620, antennas 660, a display device 610, an input device 612, a UI navigation device 614, a mass storage 616, instructions 624, a signal generation device 618, and an output controller 628. The apparatus may be configured to perform one or more of the methods and/or operations disclosed herein. The apparatus may be intended as a component of the machine 600 to perform one or more of the methods and/or operations disclosed herein, and/or to perform a portion of one or more of the methods and/or operations disclosed herein. In some embodiments, the apparatus may include a pin or other means to receive power. In some embodiments, the apparatus may include power conditioning hardware.

The term "machine readable medium" may include any medium that is capable of storing, encoding, or carrying instructions for execution by the machine 600 and that cause the machine 600 to perform any one or more of the techniques of the present disclosure, or that is capable of storing, encoding or carrying data structures used by or associated with such instructions. Non-limiting machine readable medium examples may include solid-state memories, and optical and magnetic media. Specific examples of machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); and CD-ROM and DVD-ROM disks. In some examples, machine readable media may include non-transitory machine readable media. In some examples, machine readable media may include machine readable media that is not a transitory propagating signal.

The instructions 624 may further be transmitted or received over a communications network 626 using a transmission medium via the network interface device 620 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, a Long Term Evolution (LTE) family of standards, a Universal Mobile Telecommunications System (UMTS) family of standards, peer-to-peer (P2P) networks, among others.

In an example, the network interface device 620 may include one or more physical jacks (e.g., Ethernet, coaxial, or phone jacks) or one or more antennas to connect to the communications network 626. In an example, the network interface device 620 may include one or more antennas 660 to wirelessly communicate using at least one of single-input multiple-output (SIMO), multiple-input multiple-output (MIMO), or multiple-input single-output (MISO) techniques. In some examples, the network interface device 620 may wirelessly communicate using Multiple User MIMO techniques. The term "transmission medium" shall be taken to include any intangible medium that is capable of storing, encoding or carrying instructions for execution by the machine 600, and includes digital or analog communications signals or other intangible medium to facilitate communication of such software.

Examples, as described herein, may include, or may operate on, logic or a number of components, modules, or mechanisms. Modules are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine readable medium. In an example, the software, when executed by the underlying hardware of the module, causes the hardware to perform the specified operations.

Accordingly, the term "module" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

Some embodiments may be implemented fully or partially in software and/or firmware. This software and/or firmware may take the form of instructions contained in or on a non-transitory computer-readable storage medium. Those instructions may then be read and executed by one or more processors to enable performance of the operations described herein. The instructions may be in any suitable form, such as but not limited to source code, compiled code, interpreted code, executable code, static code, dynamic code, and the like. Such a computer-readable medium may include any tangible non-transitory medium for storing information in a form readable by one or more computers, such as but not limited to read only memory (ROM); random access memory (RAM); magnetic disk storage media; optical storage media; flash memory, etc.

Figure 7:
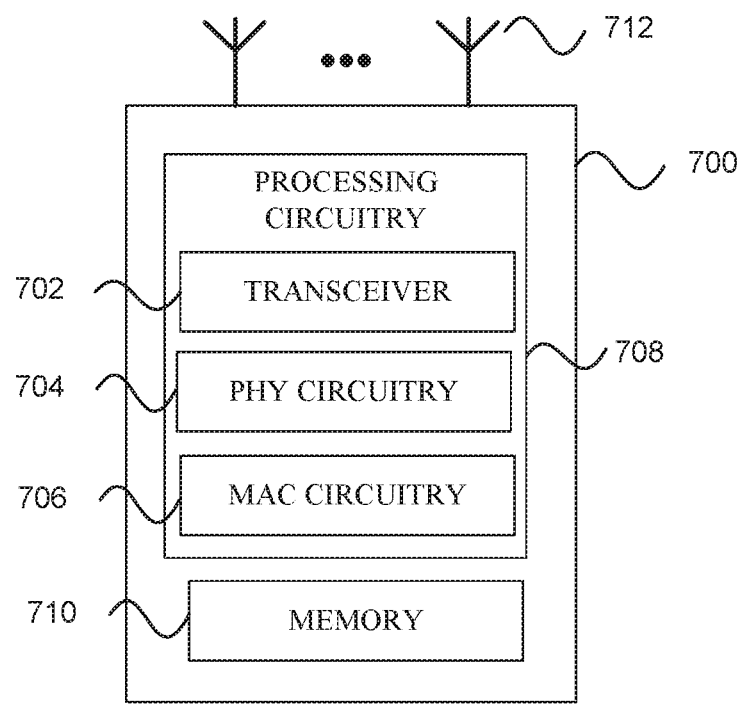
FIG. 7 illustrates a block diagram of an example wireless device upon which any one or more of the techniques (e.g., methodologies or operations) discussed herein may perform.

FIG. 7 illustrates a block diagram of an example wireless device 700 upon which any one or more of the techniques (e.g., methodologies or operations) discussed herein may perform. The wireless device 700 may be a HE device. The wireless device 700 may be a HE STA 504 and/or HE AP 502 (e.g., FIG. 5). A HE STA 504 and/or HE AP 502 may include some or all of the components shown in FIGS. 1-7. The wireless device 700 may be an example machine 600 as disclosed in conjunction with FIG. 6.

The wireless device 700 may include processing circuitry 708. The processing circuitry 708 may include a transceiver 702, physical layer circuitry (PHY circuitry) 704, and MAC layer circuitry (MAC circuitry) 706, one or more of which may enable transmission and reception of signals to and from other wireless devices 700 (e.g., HE AP 502, HE STA 504, and/or legacy devices 506) using one or more antennas 712. As an example, the PHY circuitry 704 may perform various encoding and decoding functions that may include formation of baseband signals for transmission and decoding of received signals. As another example, the transceiver 702 may perform various transmission and reception functions such as conversion of signals between a baseband range and a Radio Frequency (RF) range.

Accordingly, the PHY circuitry 704 and the transceiver 702 may be separate components or may be part of a combined component, e.g., processing circuitry 708. In addition, some of the described functionality related to transmission and reception of signals may be performed by a combination that may include one, any or all of the PHY circuitry 704 the transceiver 702, MAC circuitry 706, memory 710, and other components or layers. The MAC circuitry 706 may control access to the wireless medium. The wireless device 700 may also include memory 710 arranged to perform the operations described herein, e.g., some of the operations described herein may be performed by instructions stored in the memory 710.

The antennas 712 (some embodiments may include only one antenna) may comprise one or more directional or omnidirectional antennas, including, for example, dipole antennas, monopole antennas, patch antennas, loop antennas, microstrip antennas or other types of antennas suitable for transmission of RF signals. In some multiple-input multiple-output (MIMO) embodiments, the antennas 712 may be effectively separated to take advantage of spatial diversity and the different channel characteristics that may result.

One or more of the memory 710, the transceiver 702, the PHY circuitry 704, the MAC circuitry 706, the antennas 712, and/or the processing circuitry 708 may be coupled with one another. Moreover, although memory 710, the transceiver 702, the PHY circuitry 704, the MAC circuitry 706, the antennas 712 are illustrated as separate components, one or more of memory 710, the transceiver 702, the PHY circuitry 704, the MAC circuitry 706, the antennas 712 may be integrated in an electronic package or chip.

In some embodiments, the wireless device 700 may be a mobile device as described in conjunction with FIG. 6. In some embodiments, the wireless device 700 may be configured to operate in accordance with one or more wireless communication standards as described herein (e.g., as described in conjunction with FIGS. 1-6, IEEE 802.11). In some embodiments, the wireless device 700 may include one or more of the components as described in conjunction with FIG. 6 (e.g., display device 610, input device 612, etc.) Although the wireless device 700 is illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements may refer to one or more processes operating on one or more processing elements.

In some embodiments, an apparatus of or used by the wireless device 700 may include various components of the wireless device 700 as shown in FIG. 7 and/or components from FIGS. 1-6. Accordingly, techniques and operations described herein that refer to the wireless device 700 may be applicable to an apparatus for a wireless device 700 (e.g., HE AP 502 and/or HE STA 504), in some embodiments. In some embodiments, the wireless device 700 is configured to decode and/or encode signals, packets, and/or frames as described herein, e.g., PPDUs.

In some embodiments, the MAC circuitry 706 may be arranged to contend for a wireless medium during a contention period to receive control of the medium for a HE TXOP and encode or decode an HE PPDU. In some embodiments, the MAC circuitry 706 may be arranged to contend for the wireless medium based on channel contention settings, a transmitting power level, and a clear channel assessment level (e.g., an energy detect level).

The PHY circuitry 704 may be arranged to transmit signals in accordance with one or more communication standards described herein. For example, the PHY circuitry 704 may be configured to transmit a HE PPDU. The PHY circuitry 704 may include circuitry for modulation/demodulation, upconversion/downconversion, filtering, amplification, etc. In some embodiments, the processing circuitry 708 may include one or more processors. The processing circuitry 708 may be configured to perform functions based on instructions being stored in a RAM or ROM, or based on special purpose circuitry. The processing circuitry 708 may include a processor such as a general-purpose processor or special purpose processor. The processing circuitry 708 may implement one or more functions associated with antennas 712, the transceiver 702, the PHY circuitry 704, the MAC circuitry 706, and/or the memory 710. In some embodiments, the processing circuitry 708 may be configured to perform one or more of the functions/operations and/or methods described herein.

In mmWave technology, communication between a station (e.g., the HE stations 504 of FIG. 5 or wireless device 700) and an access point (e.g., the HE AP 502 of FIG. 5 or wireless device 700) may use associated effective wireless channels that are highly directionally dependent. To accommodate the directionality, beamforming techniques may be utilized to radiate energy in a certain direction with certain beamwidth to communicate between two devices. The directed propagation concentrates transmitted energy toward a target device in order to compensate for significant energy loss in the channel between the two communicating devices. Using directed transmission may extend the range of the millimeter-wave communication versus utilizing the same transmitted energy in omni-directional propagation.

In some embodiments, an objective of IEEE 802.11ax is to enable better spatial reuse between neighboring BSSs in dense environments. In some embodiments, a solution is to raise clear channel assessment (CCA) (e.g. OBSS_PD: OBSS packet detection level) level and reduce transmit power. In some aspects, the reduction in transmit power is in proportion to the increase in clear channel assessment level or threshold. In some embodiments, for the joint adaptation of OBSS_PD and Tx_Power, a specific proportional rule can be defined. An example of such a rule is shown in FIG. 8.

Figure 8:
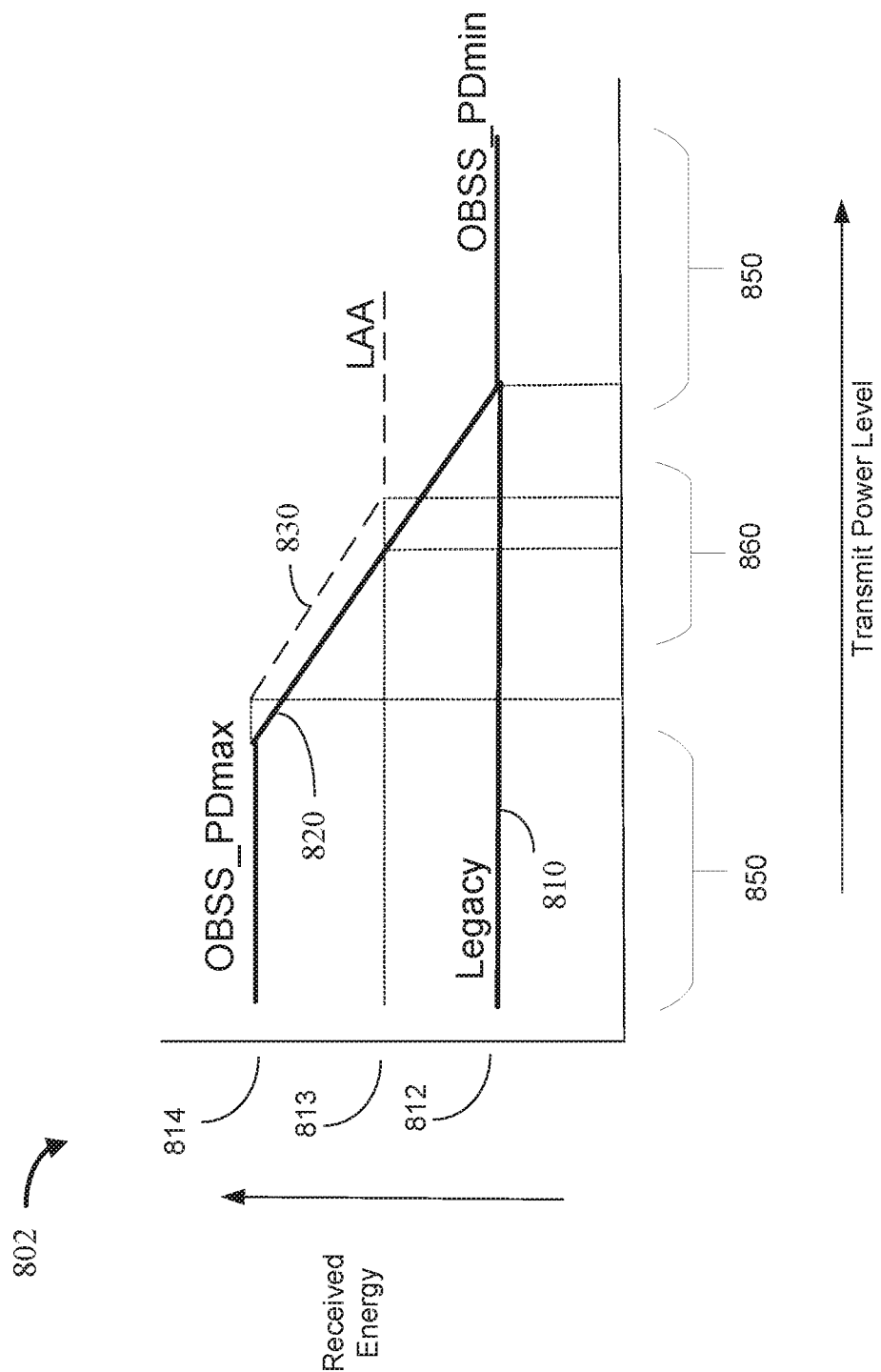
FIG. 8 is a graph showing relationships between a packet detection threshold and a transmission power.

FIG. 8 illustrates an exemplary graph 802 of transmit power relative to receive power. Some disclosed aspects may provide for increased reuse of a wireless medium. For example, these aspects may transmit a first frame concurrent with reception of a second frame when the received frame meets one or more criteria. For example, some aspects may compare a received signal strength of the received second frame to a threshold, and the results of the comparison may determine whether the receiving device may reuse the wireless medium for a transmission of the first frame, concurrently with the ongoing reception of the second frame. Some aspects may utilize Equation 1 shown below:

$$OBSS\_PD_{Threshold} = $$
$$\max\left[\begin{array}{c} OBSS\_PD_{threshold\_min}(20 \text{ MHz}) \\ \min\left(\begin{array}{c} OBSS\_PD_{threshold\_max} \\ OBSS\_PD_{threshold\_min} + (TX\_PWR_{max} - TX\_PWR) \end{array}\right) \end{array}\right]$$

$$TX\_PWR_{max} = STA's \text{ maximum power}$$

Some aspects apply different thresholds to first frames indicating a basic service set of the receiving device, as compared to second frames indicating a second basic service set different from the basic service set of the receiving device. When the frame being received indicates a different basic service set than the receiving device, this may be known as a frame that is outside the basic service set of the receiving device, or an OBSS frame. Equation 1 may be utilized in some aspects, to determine a threshold (OBSS_PDthreshold) for an OBSS frame.

The graph 802 shown in FIG. 8 shows a legacy packet detection threshold 810. Legacy packet detection threshold 812 is shown as constant regardless of transmit power. The legacy packet detection threshold 810 may be applied to packets indicating a basic service set equivalent to the basic service set of the receiving device. FIG. 8 also shows a first transmit power level 820 as a received energy of an OBSS packet varies from a minimum value 812 and maximum value 814. FIG. 8 also shows a second transmit power level 830 as the received energy varies from the minimum value 812 and a maximum value 814. Thus, graph 802 shows that when a higher packet detection threshold is utilized, a corresponding lower transmission power may be used. For example, when a maximum packet detection threshold 814 is utilized, which may effectively fail to detect packets received with an energy below the threshold, transmission power levels within the range indicated by 850 may be utilized. When a lower threshold is utilized, such as 813, then a transmission power level within range 860 may be utilized. With even lower packet detection thresholds such as 812, transmission power levels in the range shown by 870 may be utilized.

Figure 9:
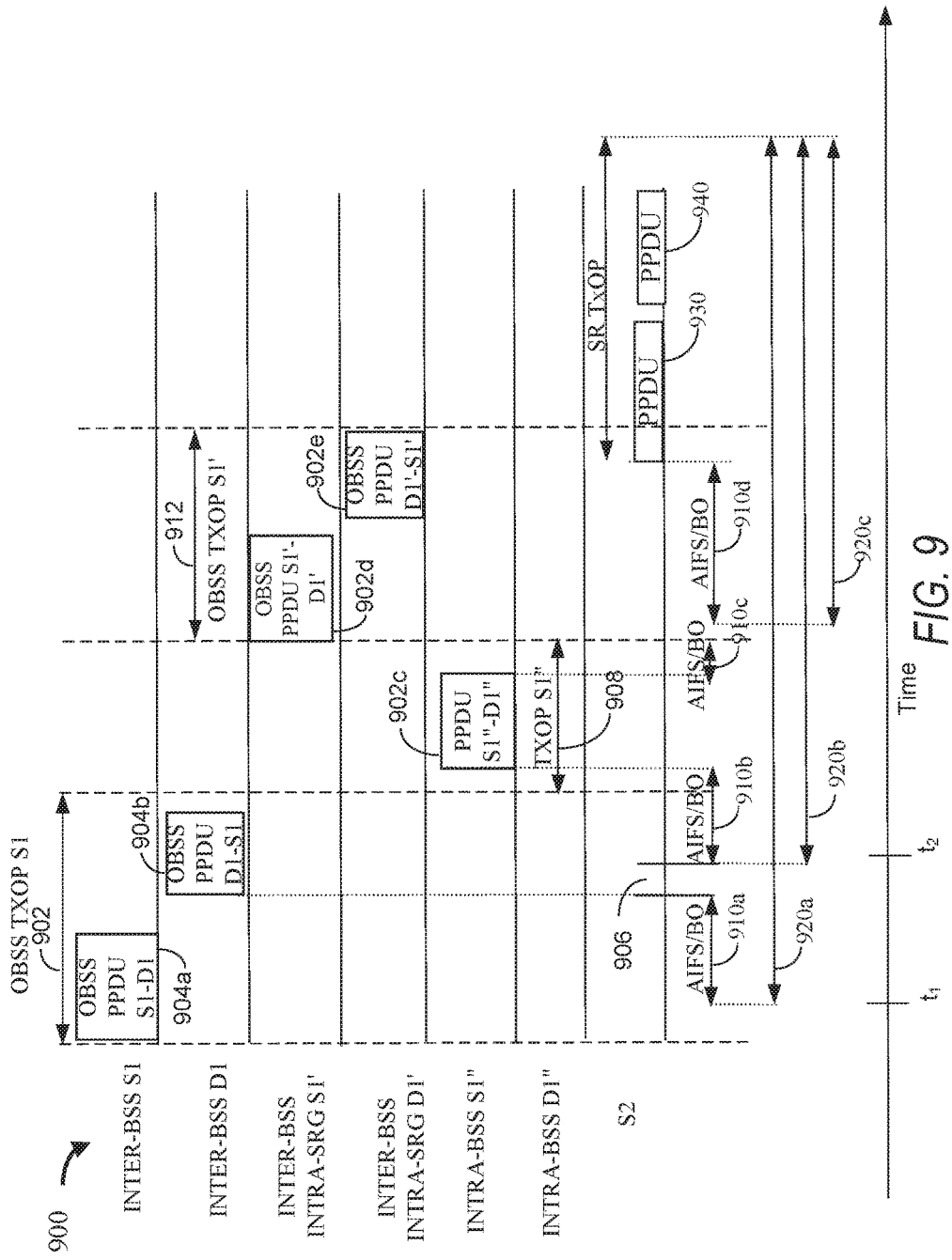
FIG. 9 illustrates a message sequence including reuse of a wireless medium.

FIG. 9 illustrates an example message sequence 900 that includes a transmission of a packet using a reduced transmit power level. The sequence 900 shows devices within at least two separate basic service sets. A first basic service set may include devices S1 (source 1), D1 (destination 1), S1' (source 1'), and D1' (destination 1'). A second basic service set may include S1" (source 1"), D1" (destination 1"), and S2 (source 2). Devices and their respective transmissions are shown horizontally in FIG. 9.

From the left, FIG. 9 shows a transmission opportunity for device S1 902. Device S1 transmits PPDU 904a during the transmission opportunity 902. Device D1 responds to the PPDU 904a with PPDU 904b, also within the transmission opportunity 902.

Near the bottom of FIG. 9, device S2, which is in a different BSS than devices S1 or D2, receives the PPDU's 904a-b. The packets 904a-b are received by device S2 at an energy level below a threshold. In some aspects, the threshold may be determined based on Equation (1) above. When PPDU 904a is received, the device S2 may first determine whether the PPDU 904a indicates the BSS of device S2 or indicates a BSS different than (outside) the BSS of device S2. Upon determining that the PPDU 904a is from an OBSS device, device S2 may begin or continue a back-off procedure 910a. Upon beginning the back-off procedure 910a, the device S2 also records a possible transmission opportunity duration 920a. The transmission opportunity duration 920a may be based on a time the back-off procedure 910a was started/continued, shown in FIG. 9 as time $t_1$.

When device S2 begins to receive the PPDU 904b, the device S2 may first determine whether the PPDU 904b is transmitted by an OBSS device. Thus, during this period of determination, device S2 may suspend its back-off procedure. The back-off procedure may then be restarted when the device S2 determines that frame 904b is also an OBSS frame. The gap between the suspension of the back-off procedure and the continuation of the back-off procedure is shown as gap 906, which again occurs between the start of transmission of PPDU 902b and the continuation of the back off procedure 910b. When the back-off procedure 910b begins, the device S2 may calculate a new transmission opportunity duration, beginning at time $t_2$, which aligns with the resumption of the back-off at 910b.

After the transmission opportunity 902 completes, a transmission opportunity 908 within the BSS of device S2 opens. The device S1" transmits a PPDU 902c within the transmission opportunity 908. Because the PPDU 902c is within the same BSS as the device S2, S2 suspends its back-off procedure for the duration of the PPDU 902c, but may resume the back-off upon completion of the reception by S2 of the PPDU 902c, shown in FIG. 9 as 910c.

After the TXOP 908 within the BSS of device S2 completes, another TXOP 912 outside the BSS of device S2 begins. The device S1' transmits PPDU 902d, which is received by the device S2. Upon initial reception of the PPDU 902d, the device S2, in some aspects, if the PPDU 902d is received at an energy level below a threshold, may determine whether the PPDU 902d is transmitted by a device within the BSS of device S2. Since PPDU 902d is transmitted by an OBSS device S1' with respect to device S2, device S2 resumes its back-off procedure after the determination, shown as 910d. Device S2 also determines a new transmission opportunity duration 920c, which starts at a time aligned with the resumption of the back-off 910d, shown in FIG. 9 as time t3.

FIG. 9 shows that S2's back-off completes when 910d reaches its end point. Because the PPDU 902e transmitted by OBSS device D1' with respect to S2 is received below an energy threshold, S2 may initiate transmission of the PPDU 930 at a reduced lower level. The disclosed methods and systems maintain the reduced power level for at least a predetermined period of time after initiating a lower power transmission. Thus, a second transmission 940 may also be transmitted at a lower power level in response to the transmission of the first PPDU 930 at the reduced power level. This contrasts with other methods, which may transmit the PPDU 940 at a higher transmission power level (i.e. above a transmission power level indicated by FIG. 8 for a given received energy level and concurrent use of a wireless medium).

Figure 10:
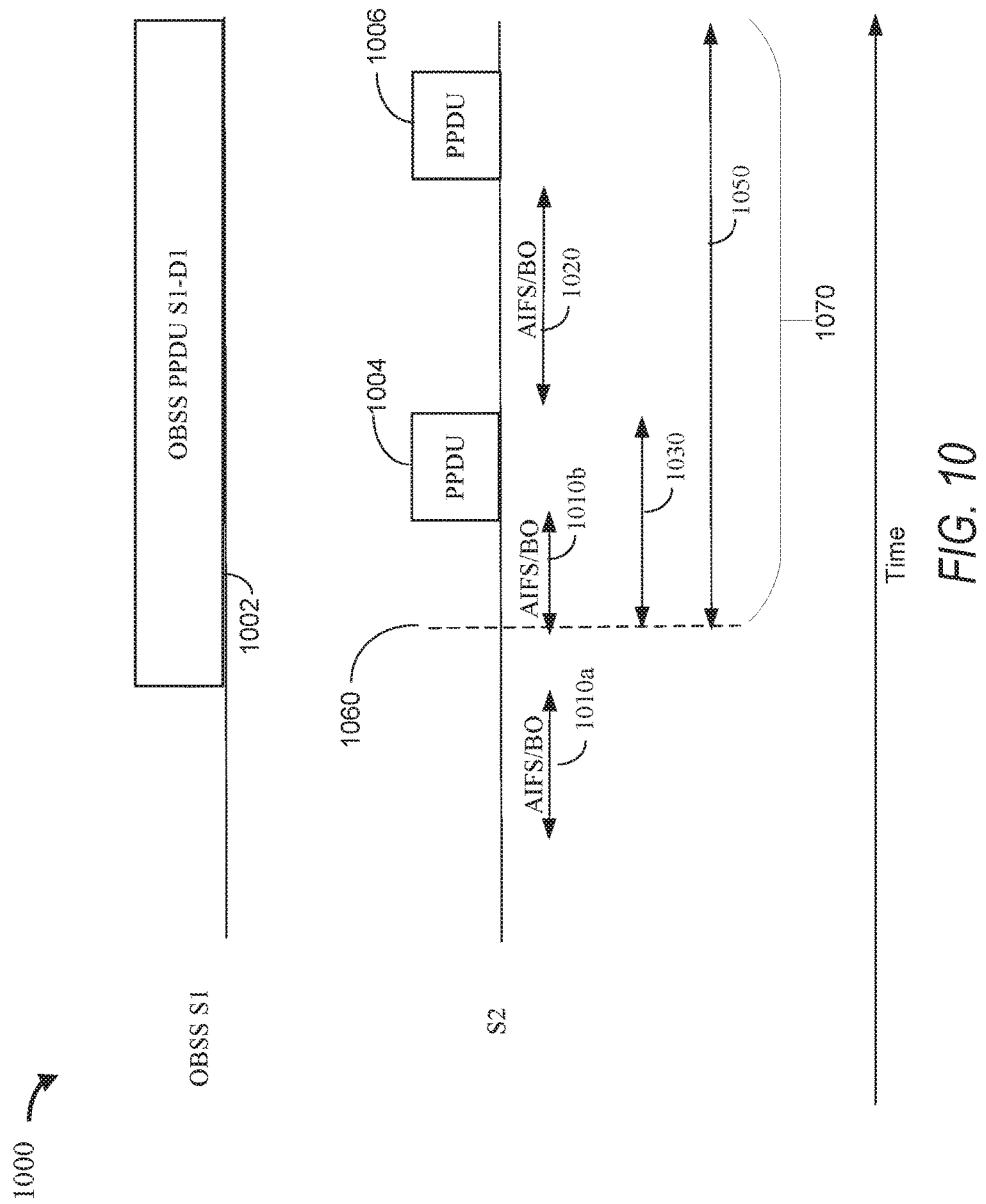
FIG. 10 illustrates a message sequence including reuse of a wireless medium.

FIG. 10 shows a message sequence including a packet collision. FIG. 10 shows two devices, a device S1 and a device S2. The device S1 is within a different basic service set than the device S1. Thus, S1 is considered an OBSS device with respect to device S2.

FIG. 10 shows that the device S2 is performing a back-off procedure 1010a when device S1 transmits a PPDU 1002. The PPDU 1002 may be received at an energy level below a threshold by the device S2, enabling device S2 to resume its back-off procedure 1010b after determining the PPDU 1002 is transmitted by an OBSS device, specifically S1. Because the device S2 is continuing its back-off procedure when receiving the OBSS packet 1002, device S2 begins a power restriction period 1030. The power restriction period 1030 indicates a time period when the device S2 will transmit with a reduced transmit power level, relative to transmissions outside the power restriction period 1040.

After the back-off procedure represented by 1010a-b completes, the device S2 may transmit a PPDU 1004 simultaneous with the transmission/reception of PPDU 1002 from the OBSS S1. Because the PPDU 1004 is transmitted during the power restriction period 1030, the transmission of PPDU 1004 uses a lower transmit power level, which reduces/prevents interference with the PPDU 1002. In some implementations that utilize power restriction period 1030, the power restriction period 1030 ends after completion of transmission of the PPDU 1004.

After transmission of the PPDU 1004, the device S2 begins a new backoff procedure 1020, which completes before transmission of the PPDU 1002 completes. Some devices may utilize separate packet detection and energy detection thresholds when suspending back-off procedures and determining whether to transmit a packet. Packet detection methods may typically rely on a frame preamble for detection, and thus packet detection may not be effective if employed after the preamble of a frame has already been transmitted. Thus, if packet detection is performed after the completion of the back-off procedure 1020, the packet 1002 may not be detected. Furthermore, in some aspects, the packet 1002 may be received at the device 1002 below an energy detection threshold. Thus, an energy detection mechanism to prevent collision employed by the device S2 may also not prevent a subsequent transmission during transmission/reception of the PPDU 1002.

Thus, device S2 may transmit the PPDU 1006 after completion of the back off procedure 1020. In implementations using the power restriction period 1030, PPDU 1006 is transmitted at a nominal power level, above the transmit power level of the packet 1004. However, because PPDU 1006 is transmitted concurrently with reception/transmission of PPDU 1002, interference/collisions may result.

The disclosed methods and systems utilized an alternative power restriction period, illustrated in FIG. 10 as power restriction period 1050. Whereas power restriction period 1030 ends at an end of a transmission opportunity used for PPDU 1004 (for example, as defined by a duration field of the PPDU 1004), the power restriction period 1050 may be defined by a minimum of the TXOP duration and a minimum power restriction period time, which is defined from when the device S2 first continued its back-off in the presence of an OBSS PPDU, shown by time 1060, and a minimum elapsed time, shown as 1070. Thus, when utilizing the extended power restriction period 1050, the PPDU 1006 may be transmitted at the reduced power level also utilized for PPDU 1004, reducing interference with OBSS PPDU 1002.

Figure 11:
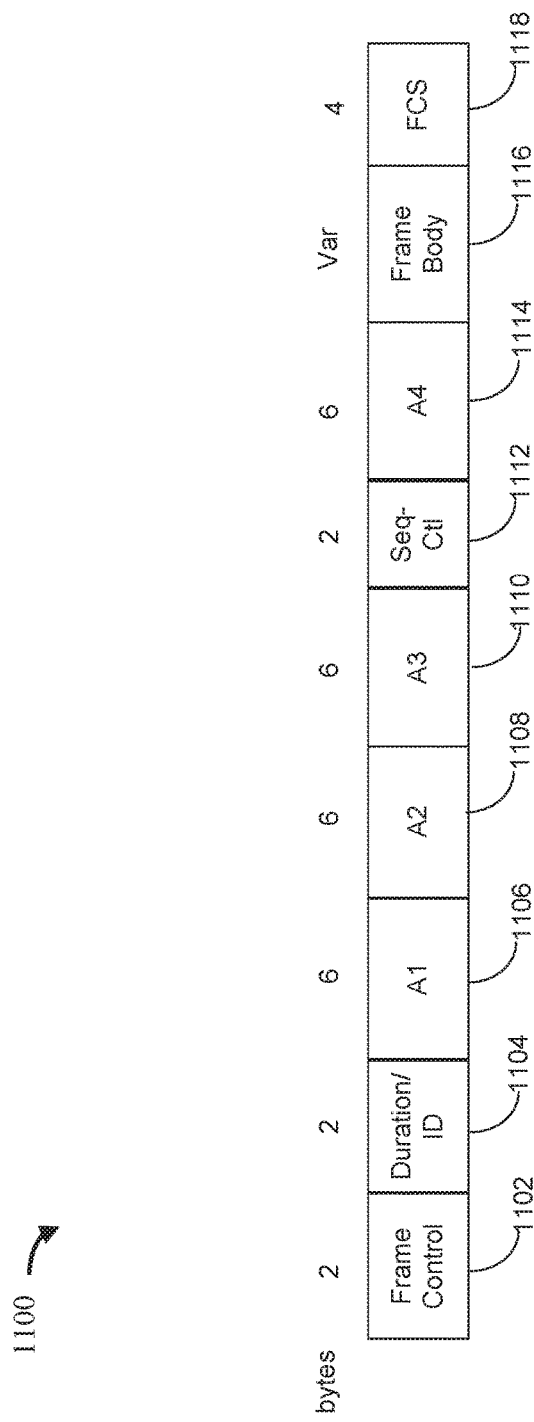
FIG. 11 is an exemplary format of a media access control frame.

FIG. 11 shows an exemplary media access control (MAC) header format. The MAC header format 1100 may be utilized by the disclosed methods, devices, and systems to communicate a minimum duration of a power restriction period, in some aspects. In some aspects, the MAC header format 1100 may be utilized by frames transmitted and/or received by the disclosed methods, systems, and devices. For example, one or more of the frames 904a-e, 930 and/or 940 may utilize the header format 1100.

The MAC header 1100 includes a frame control field 1102, a duration/id field 1104, an address 1 field 1106, an address 2 field 1108, an address 3 field 1110, a sequence control field 1112, an address 4 field 1114, a frame body 1116, and a frame check sequence field 1118.

The duration/id field 1104 may indicate a length of time that receiving devices should set their network allocation vector. The duration/id field 1104 may further indicate a duration of a transmission opportunity for a device transmitting the MAC header 1100. The disclosed embodiments may extend a power restriction period for a device, such as device S2 illustrated in the above figures, to beyond a time indicated by the duration/id field 1104 transmitted by the device. For example, the disclosed methods and systems may set a length of a power restriction period to a minimum length, and the minimum length may be longer than a length indicated by the duration/id field 1104 of a frame transmitted by a device implementing the power restriction period. The minimum length may be received by the device implementing the power restriction period, in some cases, in a beacon message from an access point.

Figure 12:
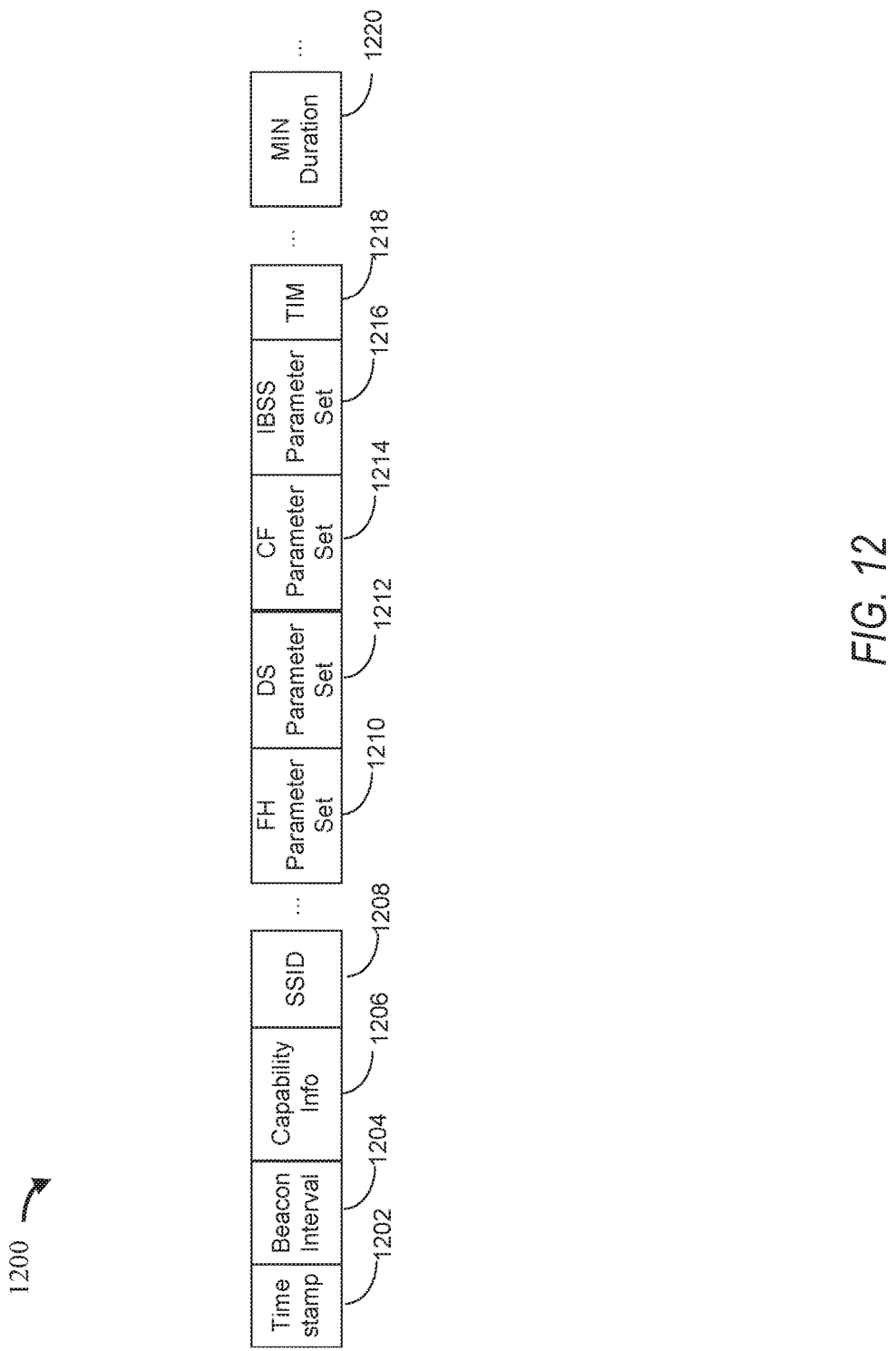
FIG. 12 is an exemplary message portion including an indication of a minimum duration of a transmit power restriction period.

FIG. 12 shows an exemplary message 1200. In some aspects, the message 1200 may be part of a beacon message transmitted by an access point. In some aspects, the message 1200 may be carried in the frame body 1116 of FIG. 11.

The message 1200 includes one or more of a time stamp field 1202, beacon interval field 1204, capability info field 1206, station identifier field 1208, frequency hopping parameter set field 1210, direct sequence (DS) parameter set field 1212, contention free parameter set 1214, infrastructure basic service set field 1216, a traffic information map (TIM) field 1218, and a minimum duration field 1220. The minimum duration field 1220 may indicate a minimum duration for a power restriction period. During the power restriction period, a device receiving the message 1200 may transmit at a reduced power level. The power restriction period may begin when the device receives a packet indicating a basic service set other than a basic service set of the receiving device. This is known as an outside basic service set (OBSS) packet. Upon receiving the OBSS packet, the device may continue a back-off procedure. As described above with respect to FIG. 8, this may occur when the OBSS packet is received with an energy that is below a threshold value. In response to the packet being received with an energy below the threshold, the back off procedure may be continued, and the transmission power may be lowered for at least a duration indicated by the minimum duration field 1220.

Figure 13:
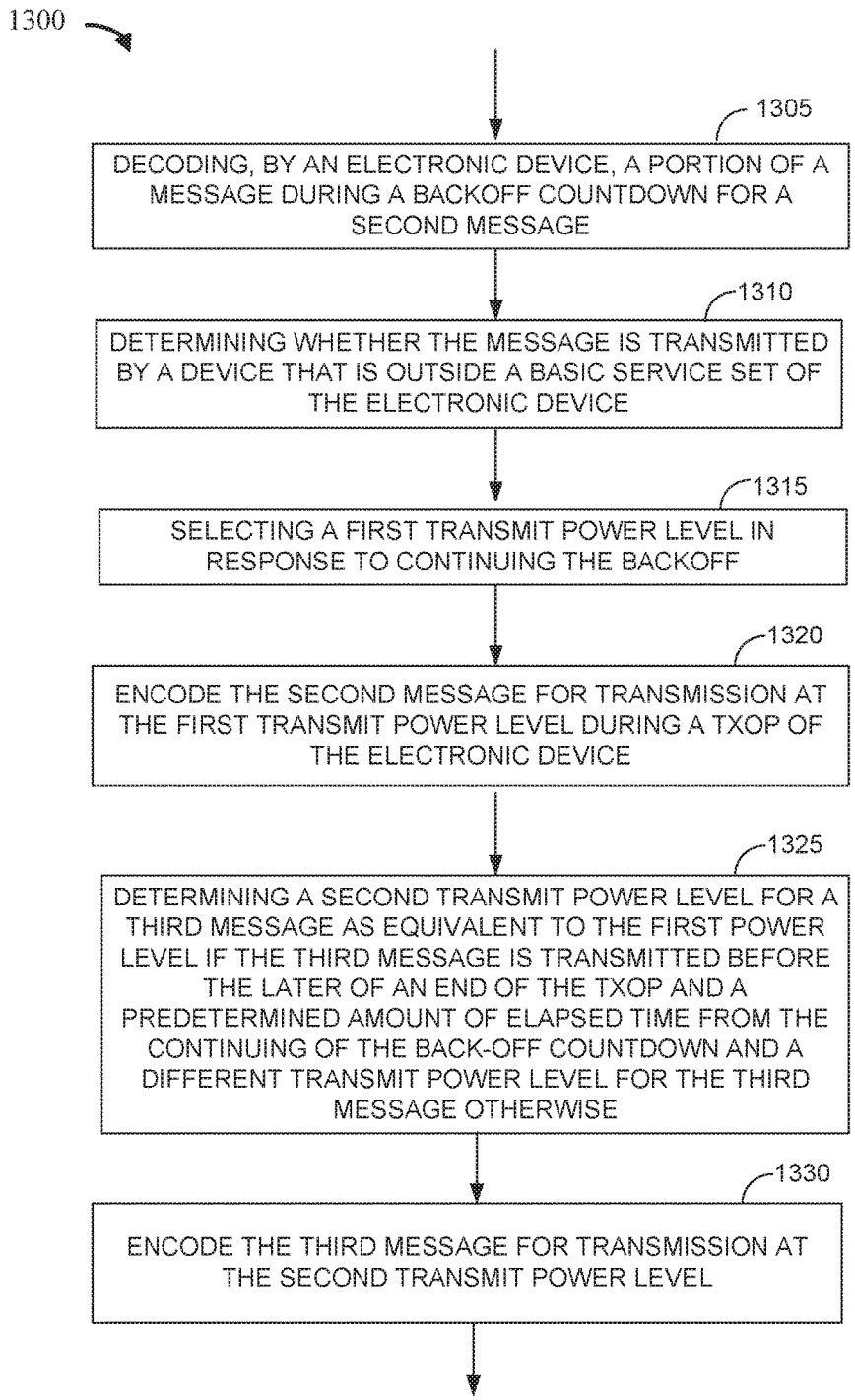
FIG. 13 is a flowchart of a method of reuse of a wireless medium.

FIG. 13 is a flowchart of a method of reuse of a wireless medium. In some aspects, the method 1300 discussed below with respect to FIG. 13 may be performed by instructions included in the control logic 406, illustrated in FIG. 4. In some other aspects, instructions included in the application processor 111 may perform one or more of the functions discussed below with respect to FIG. 1. In some aspects, an electronic memory may store instructions for a hardware processor or electronic circuitry, with the instructions configuring the hardware processor or electronic circuitry to perform one or more of the functions discussed below with respect to process 1300 and FIG. 13. In some aspects, the process 1300 may be performed by a wireless device. This wireless device is referred to in the discussion below as the executing device. The discussion of process 1300 below refers to one or more messages. In some aspects, the messages discussed below may be PLCP protocol data units (PPDUs).

In block 1305, a first message is received by an electronic device. The electronic device may be the executing device. The first message may be received during a back-off procedure for a second message. The first message may be received while a back-off counter for the back-off procedure is in an intermediate state. For example, the back-off counter may not be at its starting value or its ending value, but may be equal to a value between the starting value and the ending value. The back-off procedure may be associated with a second message. In other words, in some aspects, after the back-off procedure is complete, the executing device may transmit the second message. Block 1305 may include determining a received power level of the first message. In some aspects, the received message may be detected based on a packet detection threshold. The packet detection threshold may be a first packet detection threshold, which may be lower than a second packet detection threshold. The second packet detection threshold may be a nominal packet detection threshold, and may, in some aspects, be indicated in a legacy standard. Detecting the first message via the lower packet detection threshold may enable one or more of the following functions of process 1300. For example, in some aspects, if the first message is detected via a higher, second packet detection threshold, process 1300 may perform alternative processing, not described herein.

In some aspects, block 1305 includes performing an association procedure with an access point. For example, block 1305 may include transmitting an association request to the access point, and receiving an association response. The association response message may include an association identifier assigned to the executing device. This association identifier may be used in subsequent portions of process 1300 to determine whether a received message indicates a BSS equivalent to a BSS of the executing device, or if the indicated BSS is different.

Figure 14:
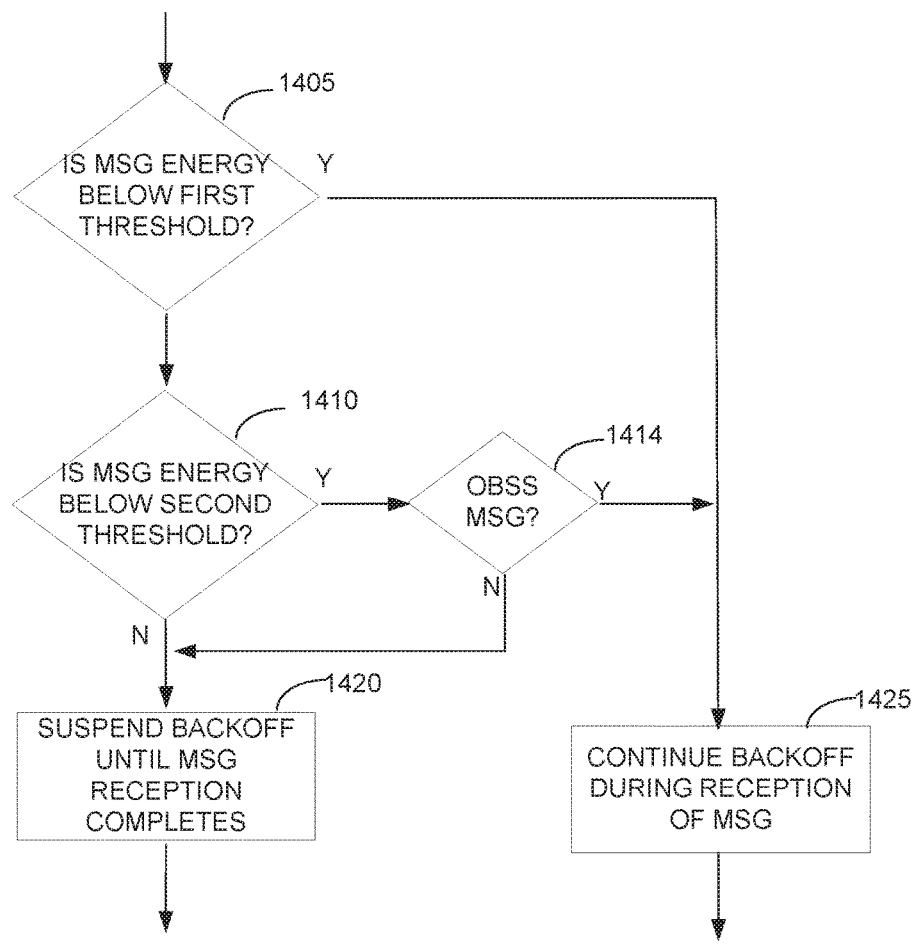
FIG. 14 is a flowchart of a method of determining whether to continue a back off countdown in response to reception of a portion of a message.

In block 1310, the received message is decoded to determine whether the first message is addressed to or transmitted by a device within a basic service set of the executing device. In other words, block 1310 may classify the received message as either an inter-BSS message or an intra-BSS message. In some aspects, this determination/classification may be based on an association identifier (AID) field included in the received first message. For example, in some aspects, the address 3 field 1110 of the first message may store an association identifier for the device transmitting the received message. This device may be identified by the address 1 field 1106 in some aspects. In other aspects, the address 3 field 1110 may store an association identifier for a device addressed by the received first message. The addressed device may be identified in some aspects by the A2 field 1108. Block 1310 may compare the BSSID stored in the received frame (e.g. field 1108) with a BSSID of the executing device. The BSSID of the executing device may be established, in some aspects, via an association procedure with an access point, as discussed above. In some aspects, block 1310 may be performed in response to the received power level of the first message being below a threshold. For example, in some aspects, if the first message is received at a power level below a threshold, and the first message indicates the message is an OBSS message, the wireless medium may be reused by the receiving device (e.g. executing device) while the first message is still being received, as discussed below. FIG. 14 describes one exemplary embodiment of how a determination of whether the received message is from an OBSS device is performed in response to an energy level of the received message being below a threshold.

In block 1315, a first transmission power level is selected in response to the determination. In some aspects, if the message indicates a basic service set that is different than the basic service set of the executing device, the back-off countdown of block 1305 may be continued at the point it was interrupted when the message portion was received. This back-off countdown may be continued while a second portion of the message is still being received by the executing device. For example, as shown in FIG. 10, the back-off countdown 1010b may occur simultaneous with the reception of a portion of PPDU 1002.

Block 1315 may also include beginning a power restriction period. In other words, block 1315 may store or otherwise make record of a time at which the back-off countdown was continued. This time may be a start time of a power restriction period. Consistent with the methods and systems of this disclosure, this power restriction period may have a minimum power restriction period duration, as discussed further below. In some aspects, process 1300 includes receiving a message indicating the minimum power restriction period duration. For example, in some aspects of process 1300, the message 1200, discussed above with respect to FIG. 12 may be received. As shown in FIG. 12, the minimum duration field 1220 may indicate the minimum power restriction period duration. Thus, process 1300 may include decoding a frame (e.g. beacon frame) to determine the minimum power restriction period duration.

At block 1320, the second message is encoded for transmission using the selected transmit power level. In some aspects, encoding a message for transmission at a particular power level may include initializing one or more memory locations in a format consistent with a PPDU, and having values corresponding values of the PPDU. Encoding the message for transmission at a power level may include passing a value indicating the power level to a hardware component that will perform the transmission. For example, a baseband processor may generate a packet for transmission and pass a pointer to the formatted packet (e.g. via an API, shared memory, or other mechanism used for communication between electronic components) to a front-end transceiver. The baseband processor may also pass, via the API, an indication of a power level to transmit the packet to the front-end transceiver.

In some aspects, block 1320 includes transmitting the second message at the selected transmit power level. The second message may be transmitted simultaneous with reception of another portion of the first message. The second message may be encoded for transmission and/or transmitted in response to the back off procedure that was continued as part of block 1315 above. The second message may be encoded for transmission and/or transmitted during a transmission opportunity of the executing device. In some aspects, the transmission opportunity is indicated by a duration field indicated in the second message. For example, in some aspects, the second message may include the exemplary header 1100, discussed above with respect to FIG. 11. The duration field 1104 may indicate a length or duration of the transmission opportunity. Devices receiving the second message may decode the duration field 1104 and set their network allocation vector to correspond to the indicated duration. This places the transmission opportunity "in effect" across the wireless network in some aspects by suppressing transmissions by other devices during a time period indicated by the duration.

In some aspects, the power restriction period initiated in block 1315 may be maintained until either the time indicated by the duration field 1104, or until a time indicated by the minimum power restriction period duration, discussed above.

Block 1325 determines a second transmit power level for a third message. The power level for the third message will depend on whether the power restriction period has expired or not. If the power restriction period has not expired, the second transmit power level for the third message may be equivalent to the first transmit power level for the second message. Otherwise, the second transmit power level may be a higher power level, such as a nominal power level. The power restriction period may be expired if the time for transmitting the third message is past the maximum of the time indicated by the duration field of the second message, or the time indicated by the minimum power restriction period duration. This later time is equivalent to an elapsed time equivalent to the minimum power restriction period duration after the power restriction period was initiated in block 1315.

In block 1330, the third message is encoded for transmission and/or transmitted at the determined second power level. In some aspects, the first and second power levels are determined in accordance with Equation 1 and/or Graph 802, both of which are discussed above with respect to FIG. 8. In some aspects, process 1300 compares the received power level of the first message with a threshold indicated in graph 802, and the first and second power levels are determined in accordance with graph 802.

FIG. 14 is a flowchart of a method of determining whether to continue a back off countdown in response to reception of a portion of a message. The message, in some aspects, may conform to the format of message 1100, discussed above with respect to FIG. 11. In some aspects, the method 1400 discussed below with respect to FIG. 14 may be performed by instructions included in the control logic 406, illustrated in FIG. 4. In some other aspects, instructions included in the application processor 111 may perform one or more of the functions discussed below with respect to FIG. 1. In some aspects, an electronic memory may store instructions for a hardware processor or electronic circuitry, with the instructions configuring the hardware processor or electronic circuitry to perform one or more of the functions discussed below with respect to process 1400 and FIG. 14. In some aspects, the process 1400 may be performed by a wireless device. This wireless device is referred to in the discussion below as the executing device.

In some aspects, process 1400 may be included in process 1300, discussed above. For example, in some aspects, process 1400 may be performed after block 1305 of process 1300. Block 1310 of process 1300 may be equivalent to decision block 1414, discussed below. When the message received by process 1300 is an OBSS message, process 1400 may move from decision block 1414 to block 1425. When the message received by process 1300 in block 1305 is not an OBSS message, process 1400 may move from decision block 1414 to block 1420. The discussion of process 1400 below refers to one or more messages. In some aspects, the messages discussed below may be PLCP protocol data units (PPDUs).

Decision block 1405 determines whether an energy level of the received message is below a first threshold. In some aspects, this first threshold may be a packet detection threshold. If the message energy is below the threshold, process 1400 moves to block 1425, which continues the back-off (of the second message of process 1300) during reception of the message. In some aspects, the first threshold may be the legacy threshold 812 discussed above with respect to FIG. 8.

If the energy level of the received message is above the first threshold, process 1400 moves to decision block 1410, which determines whether the energy is below a second threshold. In some aspects, the second threshold is the OBSS_PDmax threshold 814, discussed above with respect to FIG. 8. If the received energy is below the second threshold, process 1400 moves to decision block 1414, which determines whether the received message is a message that originates from a device outside a basic service set of the executing device. In other words, block 1414 may classify the message as either an inter-BSS message or an intra-BSS message. If the message is not from an OBSS device (the message is an intra-BSS message), or the message is not received at an energy level that is below the second threshold, process 1400 moves to block 1420, which suspends the back-off until reception of the (entire) message is completed. Otherwise, if the message does originate from outside the BSS of the receiving device, process 1400 moves to block 1425, which continues the backoff during reception of the message.

As described above, if the back-off completes while the message is still being received, a transmission may be initiated simultaneous with a reception of a remaining portion of the message.

Figure 15:
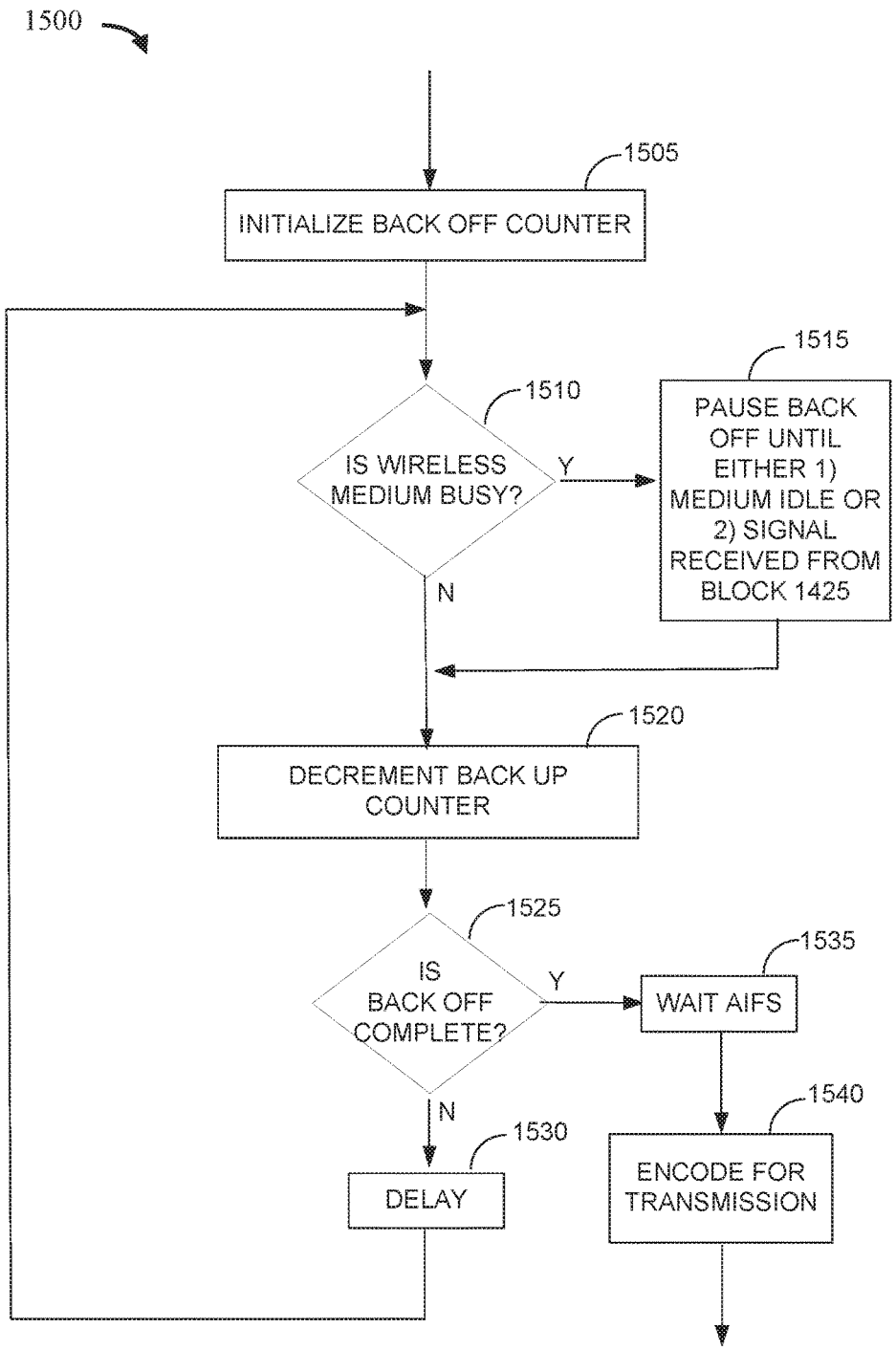
FIG. 15 is a flowchart of an exemplary back off countdown process.

FIG. 15 is a flowchart of an exemplary back off countdown process. In some aspects, the method 1500 discussed below with respect to FIG. 15 may be performed by instructions included in the control logic 406, illustrated in FIG. 4. In some other aspects, instructions included in the application processor 111 may perform one or more of the functions discussed below with respect to FIG. 1. In some aspects, an electronic memory may store instructions for a hardware processor or electronic circuitry, with the instructions configuring the hardware processor or electronic circuitry to perform one or more of the functions discussed below with respect to process 1500 and FIG. 15. In some aspects, the process 1500 may be performed by a wireless device. This wireless device is referred to in the discussion below as the executing device. The discussion of process 1500 below refers to one or more messages. In some aspects, the messages discussed below may be PLCP protocol data units (PPDUs).

In block 1505, a back off counter is initialized. Process 1500 below is described in a way that provides a back off counter that is decremented until it reaches a threshold value. Upon reaching the threshold value, the back off is complete. Thus, as described, block 1505 may initial the back off counter to a value having some distance from the threshold value. The distance may relate to how long the back off process will take to complete. While process 1500 is described as decrementing the back off counter, other embodiments may instead increment the back off counter until it reaches the threshold value. Initialization values and threshold values for the back off counters may vary across embodiments, with the distance between an initialization value and a threshold value for a particular embodiment having some impact on the length of the back off process. In some aspects, the back off counter is initialized to a constant value.

Decision block 1510 determines whether the wireless media is busy. In some aspects, decision block 1510 may determine the business of the wireless media in accordance with block 1405, discussed above with respect to FIG. 14. If the media is busy, process 1500 moves to block 1515, which pauses the back off process 1500 until one of at least two conditions are met. The first condition occurs if the media becomes idle. For example, consistent with block 1405, the media may become idle when energy on the media drops below (or equal in some aspects) to the first threshold value of process 1400. The second condition occurs when block 1425 of FIG. 14 determines that the back off countdown should be continued. After decision block 1510 and (optionally) block 1515, process 1500 moves to block 1520, which decrements the back off counter. As discussed above, other aspects of process 1500 may increment the back off counter.

Decision block 1525 determines if the back off count down is complete. In some aspects, block 1525 determines whether the back off counter meets a criterion. For example, some of these aspects compare the back off counter to a threshold value. If the back off counter equals the threshold value in these aspects, the back off countdown process is considered complete. If the back off counter does not meet the criteria, process 1500 moves to block 1530 which introduces a delay into the back off countdown process. The length of the delay may vary by embodiment, and may be zero in some aspects. The delay of block 1530 may be included to prevent the back off process from unnecessarily "spinning" and consuming too much processing power. After block 1530, process 1500 returns to decision block 1510.

Returning to decision block 1525, if decision block 1525 determines the back off is complete, process 1500 moves to block 1535, which optionally performs an arbitration interframe spacing (AIFS). Process 1500 then moves to block 1540, which may encode a message for transmission and/or perform a transmission in response to completion of the back off and (optionally) the AIFS. The encoding of the transmission and/or transmission that may be performed in block 1540 may be the same encoding and/or transmission described above with respect to block 1320.

Although the operations of some of the disclosed methods are described in a sequential order for convenient presentation, this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

The disclosed methods, apparatus, and systems should not be construed as limiting in any way. Instead, the present disclosure is directed toward all novel and nonobvious features and aspects of the various disclosed embodiments, alone and in various combinations and sub combinations with one another. The disclosed methods, apparatus, and systems are not limited to any specific aspect or feature or combination thereof, nor do the disclosed embodiments require that any one or more specific advantages be present or problems be solved.

Publications, patents, and patent documents referred to in this document are incorporated by reference herein in their entirety, as though individually incorporated by reference. In the event of inconsistent usages between this document and those documents so incorporated by reference, the usage in the incorporated reference(s) are supplementary to that of this document; for irreconcilable inconsistencies, the usage in this document controls.

The above description is intended to be illustrative, and not restrictive. For example, the above-described examples (or one or more aspects thereof) may be used in combination with others. Other embodiments may be used, such as by one of ordinary skill in the art upon reviewing the above description.

A first example implementation disclosed is an apparatus of a High Efficiency (HE) station (STA). The apparatus includes processing circuitry; and memory. The processing circuitry is configured to decode a portion of a first PLCP Protocol Data Unit (PPDU) during a back-off countdown for a second PPDU, determine whether the first PPDU indicates a basic service set that is different than a basic service set of the HE STA, classify the first PPDU as either an inter-basic service set (BSS) PPDU or an intra-BSS PPDU, continue the back-off countdown in response to classifying the first PPDU as an inter-BSS PPDU, select a first transmit power level in response to continuing the back-off, encode the second PPDU for transmission in accordance with the first transmit power level during a transmission opportunity (TXOP) of the HE STA in response to a completion of the back-off countdown, determine a second transmit power level for a third PPDU as equivalent to the first transmit power level when the third PPDU is encoded for transmission after an end of the transmission opportunity and before a predetermined amount of time has elapsed from the continuing of the back-off countdown, and encode the third PPDU for transmission at the second transmit power.

In a second example implementation, the processing circuitry is further configured to determine a power restriction period starting at the continuing of the back-off countdown and ending at the larger of a transmission opportunity of the apparatus and the predetermined amount of elapsed time; and encoding for transmission at the first power level during the power restriction period and encoding for transmission at a power level higher than the first power level outside the power restriction period. In a third example implementation, the processing circuitry is further configured to encode a fourth PPDU for transmission at a third transmit power level higher than the first transmit power level in response to the fourth PPDU being encoded for transmission after the predetermined amount of time has elapsed from the continuing of the back-off countdown. In a fourth example implementation, the processing circuitry is further configured to decode a PPDU from an access point indicating the predetermined amount of elapsed time. In a fifth example implementation, the processing circuitry is further configured to decode the predetermined amount of elapsed time in a beacon PPDU of the access point. In a sixth example implementation, the processing circuitry is further configured to suspend the back-off countdown in response to receiving the first PPDU, and the classification of the first PPDU is in response to a received power of the first PPDU being below a threshold. In a seventh example implementation, the processing circuitry is further configured to maintain suspension of the back-off countdown until at least a completion of the reception of the first PPDU in response to determining the first PPDU is an intra-BSS PPDU. In an eighth example implementation, the processing circuitry is further configured to determine the received power level of the first PPDU, wherein the continuing of the back-off countdown during reception of the first PPDU is in response to the received power level being below the threshold. A ninth example implementation of the apparatus includes transceiver circuitry coupled to the processing circuitry. A tenth example implementation of the apparatus includes one or more antennas coupled to the transceiver circuitry. In an eleventh example implementation, the memory stores the second transmit power level.

An eleventh example implementation is a method, performed by a STA for encoding a PLCP protocol data unit (PPDU) for transmission. The method includes decoding, by the STA, a portion of a first PPDU during a back-off countdown for a second PPDU, classifying, by the STA, whether the first PPDU is an inter-BSS PPDU or an intra-BSS PPDU, continuing, by the STA, the back-off countdown in response to classifying the first PPDU as an inter-BSS PPDU, selecting, by an STA, a first transmit power level in response to continuing the back-off, encoding the second PPDU for transmission according to the first transmit power level during a transmission opportunity of the first STA in response to a completion of the back-off countdown, determining, by the STA, a second transmit power level for a third PPDU as equivalent to the first transmit power level when the third PPDU is encoded for transmission after an end of the transmission opportunity and before a predetermined amount of time has elapsed from the continuing of the back-off countdown, and encoding, by the STA, the third PPDU for transmission at the second transmit power.

A twelfth example implementation of the method includes encoding a fourth PPDU for transmission at a different transmit power level in response to the fourth PPDU being encoded for transmission after the predetermined amount of time has elapsed from the continuing of the back-off countdown. In a thirteenth example implementation of the method, the different transmit power level is higher than the first transmit power. A fourteenth example implementation of the method includes receiving a PPDU from an access point indicating the predetermined amount of elapsed time. A fifteenth example implementation includes decoding the predetermined amount of elapsed time in a beacon PPDU of the access point. A sixteenth example implementation includes suspending the back-off countdown in response to a received power of the first PPDU meeting a criterion. The classification of the first PPDU is in response to the received power not meeting the criterion.

An eighteenth example implementation includes maintaining suspension of the back-off countdown until at least a completion of the reception of the first PPDU in response to classifying the first PPDU as an intra-BSS PPDU. A nineteenth example implementation includes determining a received power level of the first PPDU, wherein the continuing of the back-off countdown is in response to the received power level meeting a second criteria.

A twentieth example implementation is a non-transitory computer readable medium comprising instructions that when executed configure processing circuitry of a station (STA) for transmission of a PLCP protocol data unit (PPDU) on a wireless network. The processing circuitry is configured to decode, by the STA, a portion of a first PPDU during a back-off countdown for a second PPDU, classify, by the STA, whether the first PPDU is either an inter-BSS PPDU or an intra-BSS PPDU, continue, by the STA, the back-off countdown in response to classifying the first PPDU as an inter-BSS PPDU, select, by the STA, a first transmit power level in response to continuing the back-off, encode the second PPDU for transmission according to the first transmit power level during a transmission opportunity of the STA in response to a completion of the back-off countdown, determine, by the STA, a second transmit power level for a third PPDU as equivalent to the first transmit power level when the third PPDU is encoded for transmission after an end of the transmission opportunity and before a predetermined amount of time has elapsed from the continuing of the back-off countdown, and encode, by the STA, the third PPDU for transmission at the second transmit power.

A twenty first example implementation of the non-transitory computer readable medium includes determining a power restriction period starting at the continuing of the back-off countdown and ending at the larger of a transmission opportunity of the STA and the predetermined amount of elapsed time; encode a PPDU for transmission at the first power level during the power restriction period and encoding the PPDU for transmission at a power level higher than the first power level outside the power restriction period.

A twenty second example implementation is an apparatus of a High Efficiency (HE) station (STA). The apparatus includes means for decoding a portion of a first PLCP Protocol Data Unit (PPDU) during a back-off countdown for a second PPDU, means for determining whether the first PPDU indicates a basic service set that is different than a basic service set of the HE STA, means for classifying the first PPDU as either an inter-basic service set (BSS) PPDU or an intra-BSS PPDU, means for continuing the back-off countdown in response to classifying the first PPDU as an inter-BSS PPDU, means for selecting a first transmit power level in response to continuing the back-off, means for encoding the second PPDU for transmission in accordance with the first transmit power level during a transmission opportunity (TXOP) of the HE STA in response to a completion of the back-off countdown, means for determining a second transmit power level for a third PPDU as equivalent to the first transmit power level when the third PPDU is encoded for transmission after an end of the transmission opportunity and before a predetermined amount of time has elapsed from the continuing of the back-off countdown; and means for encoding the third PPDU for transmission at the second transmit power.

A twenty third example implementation of the apparatus includes means for determining a power restriction period starting at the continuing of the back-off countdown and ending at the larger of a transmission opportunity of the apparatus and the predetermined amount of elapsed time; and means for encoding for transmission at the first power level during the power restriction period and transmitting at a power level higher than the first power level outside the power restriction period. A twenty fourth example implementation of the apparatus includes means for encoding a fourth PPDU for transmission at a third transmit power level higher than the first transmit power level in response to the fourth PPDU being encoded for transmission after the predetermined amount of time has elapsed from the continuing of the back-off countdown. A twenty fifth example implementation of the apparatus includes means for decoding a PPDU from an access point indicating the predetermined amount of elapsed time.

A twenty sixth example implementation of the apparatus includes means for decoding the predetermined amount of elapsed time in a beacon PPDU of the access point. A twenty seventh example implementation of the apparatus includes means for suspending the back-off countdown in response to receiving the first PPDU, and the classification of the first PPDU is in response to a received power of the first PPDU being below a threshold. A twenty eighth example implementation of the apparatus includes means for maintaining suspension of the back-off countdown until at least a completion of the reception of the first PPDU in response to determining the first PPDU is an intra-BSS PPDU. A twenty ninth example implementation of the apparatus includes means for determining the received power level of the first PPDU, wherein the continuing of the back-off countdown during reception of the first PPDU is in response to the received power level being below the threshold.

The Abstract is provided to allow the reader to ascertain the nature and gist of the technical disclosure. It is submitted with the understanding that it will not be used to interpret or limit the scope or meaning of the claims. Also, in the above Detailed Description, various features may be grouped together to streamline the disclosure. However, the claims may not set forth every feature disclosed herein as embodiments may feature a subset of said features. Further, embodiments may include fewer features than those disclosed in an example. Thus, the following claims are hereby incorporated into the Detailed Description, with a claim standing on its own as a separate embodiment. The scope of the embodiments disclosed herein is to be determined with reference to the appended claims, along with the full scope of equivalents to which such claims are entitled.

I claim:

1. An apparatus of a High Efficiency (HE) station (STA), the apparatus comprising processing circuitry, and memory, configured to:
   decode a portion of a first PLCP Protocol Data Unit (PPDU) during a back-off countdown for a second PPDU;
   determine whether the first PPDU indicates a basic service set that is different than a basic service set of the HE STA;
   classify the first PPDU as either an inter-basic service set (BSS) PPDU or an intra-BSS PPDU;
   continue the back-off countdown in response to classifying the first PPDU as an inter-BSS PPDU;
   select a first transmit power level in response to continuing the back-off;
   encode the second PPDU for transmission in accordance with the first transmit power level during a transmission opportunity (TXOP) of the HE STA in response to a completion of the back-off countdown;
   determine a second transmit power level for a third PPDU as equivalent to the first transmit power level when the third PPDU is encoded for transmission after an end of the transmission opportunity and before a predetermined amount of time has elapsed from the continuing of the back-off countdown; and
   encode the third PPDU for transmission at the second transmit power.

2. The apparatus of claim 1, wherein the processing circuitry is further configured to determine a power restriction period starting at the continuing of the back-off countdown and ending at the larger of a transmission opportunity of the apparatus and the predetermined amount of elapsed time; and encoding for transmission at the first power level during the power restriction period and encoding for transmission at a power level higher than the first power level outside the power restriction period.

3. The apparatus of claim 1, wherein the processing circuitry is further configured to encode a fourth PPDU for transmission at a third transmit power level higher than the first transmit power level in response to the fourth PPDU being encoded for transmission after the predetermined amount of time has elapsed from the continuing of the back-off countdown.

4. The apparatus of claim 1, wherein the processing circuitry is further configured to decode a PPDU from an access point indicating the predetermined amount of elapsed time.

5. The apparatus of claim 4, wherein the processing circuitry is further configured to decode the predetermined amount of elapsed time in a beacon PPDU of the access point.

6. The apparatus of claim 1, wherein the processing circuitry is further configured to suspend the back-off countdown in response to receiving the first PPDU, and the classification of the first PPDU is in response to a received power of the first PPDU being below a threshold.

7. The apparatus of claim 6, wherein the processing circuitry is further configured to maintain suspension of the back-off countdown until at least a completion of the reception of the first PPDU in response to determining the first PPDU is an intra-BSS PPDU.

8. The apparatus of claim 6, wherein the processing circuitry is further configured to determine the received power level of the first PPDU, wherein the continuing of the back-off countdown during reception of the first PPDU is in response to the received power level being below the threshold.

9. The apparatus of claim 1, further comprising transceiver circuitry coupled to the processing circuitry.

10. The apparatus of claim 9, further comprising one or more antennas coupled to the transceiver circuitry.

11. The apparatus of claim 1, wherein the memory stores the second transmit power level.

12. A method, performed by a STA for encoding a PLCP protocol data unit (PPDU) for transmission, comprising:
   decoding, by the STA, a portion of a first PPDU during a back-off countdown for a second PPDU;
   classifying, by the STA, whether the first PPDU is an inter-BSS PPDU or an intra-BSS PPDU;
   continuing, by the STA, the back-off countdown in response to classifying the first PPDU as an inter-BSS PPDU;
   selecting, by an STA, a first transmit power level in response to continuing the back-off;
   encoding the second PPDU for transmission according to the first transmit power level during a transmission opportunity of the first STA in response to a completion of the back-off countdown;
   determining, by the STA, a second transmit power level for a third PPDU as equivalent to the first transmit power level when the third PPDU is encoded for transmission after an end of the transmission opportunity and before a predetermined amount of time has elapsed from the continuing of the back-off countdown; and
   encoding, by the STA, the third PPDU for transmission at the second transmit power.

13. The method of claim 12, further comprising encoding a fourth PPDU for transmission at a different transmit power level in response to the fourth PPDU being encoded for transmission after the predetermined amount of time has elapsed from the continuing of the back-off countdown.

14. The method of claim 13, wherein the different transmit power level is higher than the first transmit power.

15. The method of claim 12, further comprising receiving a PPDU from an access point indicating the predetermined amount of elapsed time.

16. The method of claim 15, further comprising receiving the predetermined amount of elapsed time in a beacon PPDU of the access point.

17. The method of claim 12, further comprising suspending the back-off countdown in response to a received power of the first PPDU meeting a criterion, wherein the classification of the first PPDU is in response to the received power not meeting the criteria.

18. The method of claim 17, further comprising maintaining suspension of the back-off countdown until at least a completion of the reception of the first PPDU in response to classifying the first PPDU as an intra-BSS PPDU.

19. The method of claim 12, further comprising:
determining a received power level of the first PPDU, wherein the continuing of the back-off countdown is in response to the received power level meeting a second criteria.

20. A non-transitory computer readable medium comprising instructions that when executed configure processing circuitry of a station (STA) for transmission of a PLCP protocol data unit (PPDU) on a wireless network, the processing circuitry configured to:
decode, by the STA, a portion of a first PPDU during a back-off countdown for a second PPDU;
classify, by the STA, whether the first PPDU is either an inter-BSS PPDU or an intra-BSS PPDU;
continue, by the STA, the back-off countdown in response to classifying the first PPDU as an inter-BSS PPDU;
select, by the STA, a first transmit power level in response to continuing the back-off;
encode the second PPDU according to the first transmit power level during a transmission opportunity of the STA in response to a completion of the back-off countdown;
determine, by the STA, a second transmit power level for a third PPDU as equivalent to the first transmit power level when the third PPDU is encoded for transmission after an end of the transmission opportunity and before a predetermined amount of time has elapsed from the continuing of the back-off countdown; and
encode, by the STA, the third PPDU for transmission at the second transmit power.

21. The non-transitory computer readable medium of claim 20, the method further comprising determining a power restriction period starting at the continuing of the back-off countdown and ending at the larger of a transmission opportunity of the STA and the predetermined amount of elapsed time; and encoding a PPDU for transmission at the first power level during the power restriction period and encoding another PPDU for transmission at a power level higher than the first power level outside the power restriction period.

* * * * *

UNITED STATES PATENT AND TRADEMARK OFFICE
CERTIFICATE OF CORRECTION

PATENT NO. : 10,251,125 B2
APPLICATION NO. : 15/714501
DATED : April 2, 2019
INVENTOR(S) : Laurent Cariou Page 1 of 1

It is certified that error appears in the above-identified patent and that said Letters Patent is hereby corrected as shown below:

In the Claims

In Column 29, Line 33, in Claim 1, delete "circuitry," and insert --circuitry;-- therefor Signed and Sealed this
First Day of December, 2020

Andrei Iancu
*Director of the United States Patent and Trademark Office*